United States Patent
Kim et al.

(10) Patent No.: US 12,189,434 B2
(45) Date of Patent: Jan. 7, 2025

(54) DISPLAY DEVICE

(71) Applicant: LG ELECTRONICS INC., Seoul (KR)

(72) Inventors: Chulki Kim, Seoul (KR); Jonggil Pyo, Seoul (KR); Jaehun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 18/093,461

(22) Filed: Jan. 5, 2023

(65) Prior Publication Data
US 2023/0393628 A1    Dec. 7, 2023

(30) Foreign Application Priority Data

Jun. 3, 2022   (KR) .................. 10-2022-0068075

(51) Int. Cl.
*G06F 1/16*   (2006.01)

(52) U.S. Cl.
CPC .......... *G06F 1/1656* (2013.01); *G06F 1/1652* (2013.01)

(58) Field of Classification Search
CPC .... G06F 1/1652; G06F 1/1601; G06F 1/1605; G06F 1/182; G06F 1/16; G06F 1/1607; G06F 1/1624; G06F 1/1675; G06F 1/1677; G06F 1/181; G06F 2203/04803; G06F 3/0482; G06F 3/04842; G06F 3/04847; G06F 3/16; H05K 5/0217; H05K 5/0017; H05K 5/03; H05K 5/04; H05K 7/20963; G09F 9/301

See application file for complete search history.

(56) References Cited

U.S. PATENT DOCUMENTS

| | | | |
|---|---|---|---|
| 9,116,662 B1* | 8/2015 | Song | G06F 1/1601 |
| 10,383,238 B2* | 8/2019 | Yun | H04N 5/64 |
| 10,607,438 B2* | 3/2020 | Froy | G07F 17/34 |
| 11,416,034 B2* | 8/2022 | Yoo | G09F 9/301 |
| 11,567,546 B2* | 1/2023 | Kim | G06F 1/181 |
| 11,630,635 B2* | 4/2023 | Cho | G02F 1/133305 381/152 |

(Continued)

FOREIGN PATENT DOCUMENTS

| JP | 2016-33526 A | 3/2016 |
|---|---|---|
| KR | 10-2015-0122511 A | 11/2015 |

(Continued)

*Primary Examiner* — Abhishek M Rathod
(74) *Attorney, Agent, or Firm* — Birch, Stewart, Kolasch & Birch, LLP

(57) ABSTRACT

A display device may include: a flexible display panel having a left side and a right side opposite to each other in a curved direction of the display panel; a flexible plate disposed at a rear of the display panel and to which the display panel is coupled; a flexible bracket disposed at a rear of the plate and fixed to the plate at a position adjacent to a periphery of the bracket; and a rear cover covering a rear of the bracket and fixed to the bracket at a position adjacent to a central portion of the bracket, wherein: the rear cover may include a first side part protruding from a left side of the rear cover toward the bracket; and the bracket may include a first bending portion protruding rearward from a left side of the bracket, and a first rib provided inside the first bending portion and disposed opposite the first bending portion with respect to the first side part.

15 Claims, 28 Drawing Sheets

(56) References Cited

U.S. PATENT DOCUMENTS

| | | | |
|---|---|---|---|
| D1,034,594 S * | 7/2024 | Kim | D14/371 |
| 2015/0145837 A1* | 5/2015 | Park | H04N 21/41265 |
| | | | 345/184 |
| 2021/0223833 A1* | 7/2021 | Na | G06F 1/185 |
| 2022/0201883 A1* | 6/2022 | Cho | G09F 9/301 |

FOREIGN PATENT DOCUMENTS

| | | |
|---|---|---|
| KR | 10-2017-0067368 A | 6/2017 |
| KR | 10-2021-0001447 A | 1/2021 |
| KR | 10-2021-0056094 A | 5/2021 |

* cited by examiner

DISPLAY DEVICE

CROSS REFERENCE TO RELATED APPLICATION

This application claims the priority benefit of Korean Patent Application No. 10-2022-0068075, filed on Jun. 3, 2022, the disclosure of which is incorporated herein by reference in its entirety.

BACKGROUND

1. Technical Field

The present disclosure relates to a display device. More specifically, the present disclosure relates to a display device capable of changing a curvature of a display panel.

2. Description of the Related Art

With the development of information society, there is an increasing demand for various types of display devices. In order to meet such demand, various display devices, such as a Liquid Crystal Display Device (LCD), a Plasma Display Panel (PDP), an Electro luminescent Display (ELD), a Vacuum Fluorescent Display (VFD), an Organic Light Emitting Diode (OLED), and the like, have been developed and used.

Among these devices, an OLED panel can display an image by depositing an organic material layer capable of emitting light by itself on a substrate on which a transparent electrode is formed. The OLED panel may not only have a thin thickness, but also have flexible characteristics. A lot of research has been conducted on structural characteristics of a display device having such an OLED panel.

SUMMARY

An object of the present disclosure is to solve the above and other problems.

Another object of the present disclosure may be to provide a structure that can freely change a curvature of a display panel.

Another object of the present disclosure may be to provide a mechanism that can freely change a curvature of a display panel.

Another object of the present disclosure may be to provide a structure that can minimize the separation of a side surface of a bracket to which an electronic component such as a timing controller board is mounted, which is due to a display panel being bent.

Another object of the present disclosure may be to provide a sliding structure of a side surface of a bracket for a rear cover that covers the rear of the bracket.

Another objective of the present disclosure to provide a structure that can prevent a display panel from being exposed to the outside in the vicinity of a corner of a rear cover, which is due to the display panel being bent.

In accordance with an aspect of the present disclosure for achieving the above and other objects, a display device may include: a flexible display panel having a left side and a right side opposite to each other in a curved direction of the display panel; a flexible plate disposed at a rear of the display panel and to which the display panel is coupled; a flexible bracket disposed at a rear of the plate, the bracket being fixed to the plate at a position adjacent to a periphery of the bracket; and a rear cover covering a rear of the bracket, the rear cover being fixed to the bracket at a position adjacent to a central portion of the bracket, wherein the rear cover includes a first side part protruding from a left side of the rear cover toward the bracket, and wherein the bracket may include: a first bending portion protruding rearward from a left side of the bracket; and a first rib provided inside the first bending portion, the first rib being disposed opposite the first bending portion with respect to the first side part.

DETAILED DESCRIPTION OF THE PREFERRED EMBODIMENTS

Figure 1:
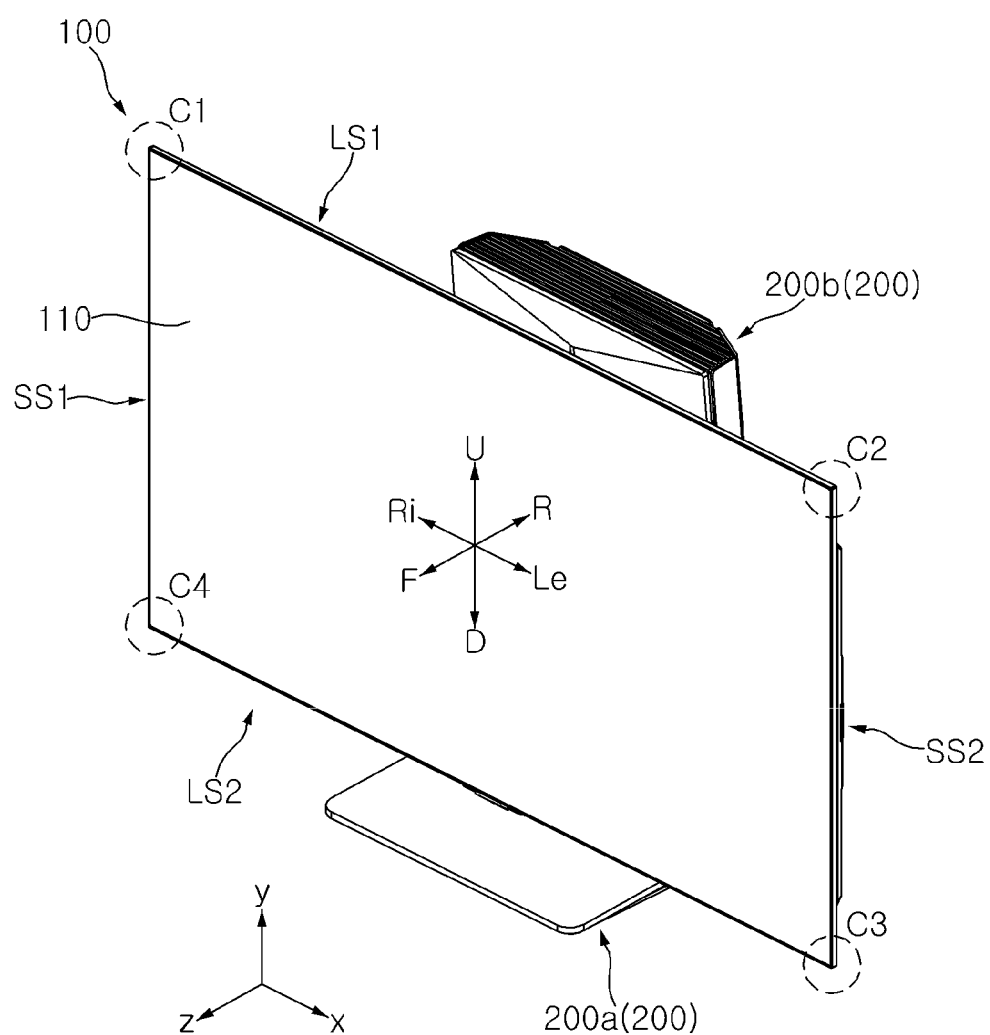
FIGS. 1 to 28 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components are provided with the same or similar reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

The directions up U, down D, left Le, right Ri, front F, and rear R shown in the drawings are only for the convenience of explanation, and the technical idea of the present disclosure is not limited by these directions.

In the following description, an organic light emitting diode panel (OLED panel) will be used as an example to describe a display panel, but a display panel applicable to the present disclosure is not limited to the OLED panel.

Referring to FIG. 1, a display device 100 may include a display panel 110. The display panel 110 may define a front surface of the display device 100, and may display an image forward.

The display device 100 may include a first long side LS1, a second long side LS2 opposite the LS1, a first short side SS1 adjacent to the first long side LS1 and the second long side LS2, and a second short side SS2 opposite the first short side SS1. For the convenience of explanation, FIG. 1 illustrates an example in which lengths of the first and second long sides LS1 and LS2 are greater than lengths of the first and second short sides SS1 and SS2, but the lengths of the first and second long sides LS1 and LS2 may be approximately equal to the lengths of the first and second short sides SS1 and SS2.

A direction parallel to the first and second long sides LS1 and LS2 of the display device 100 may be a left-and-right direction. A direction parallel to the first and second short sides SS1 and SS2 of the display device 100 may be an up-and-down direction. A direction perpendicular to the first and second long sides LS1 and LS2, and the first and second short sides SS1 and SS2 of the display device 100 may be a front-and-rear direction.

A direction or side in which the display device 100 displays an image may be a 'front' F, z side, and a direction or side opposite of front may be a 'rear' R side. The first short side SS1 may be a 'right' Ri side. The second short side SS2 may be a 'left' Le, x side. The first long side LS1 may be an 'up (upper)' U, y side. The second long side LS2 may be a 'down (lower)' D side.

The first long side LS1, the second long side LS2, the first short side SS1, and the second short side SS2 may be referred to as edges of the display device 100. In addition, points where the first long side LS1, the second long side LS2, the first short side SS1, and the second short side SS2 meet each other may be referred to as corners.

A point where the first short side SS1 and the first long side LS1 meet each other may be referred to as a first corner C1. A point where the first long side LS1 and the second short side SS2 meet each other may be referred to as a second corner C2. A point where the second short side SS2 and the second long side LS2 meet each other may be referred to as a third corner C3. A point where the second long side LS2 and the first short side SS1 meet each other may be referred to as a fourth corner C4.

Figure 2:
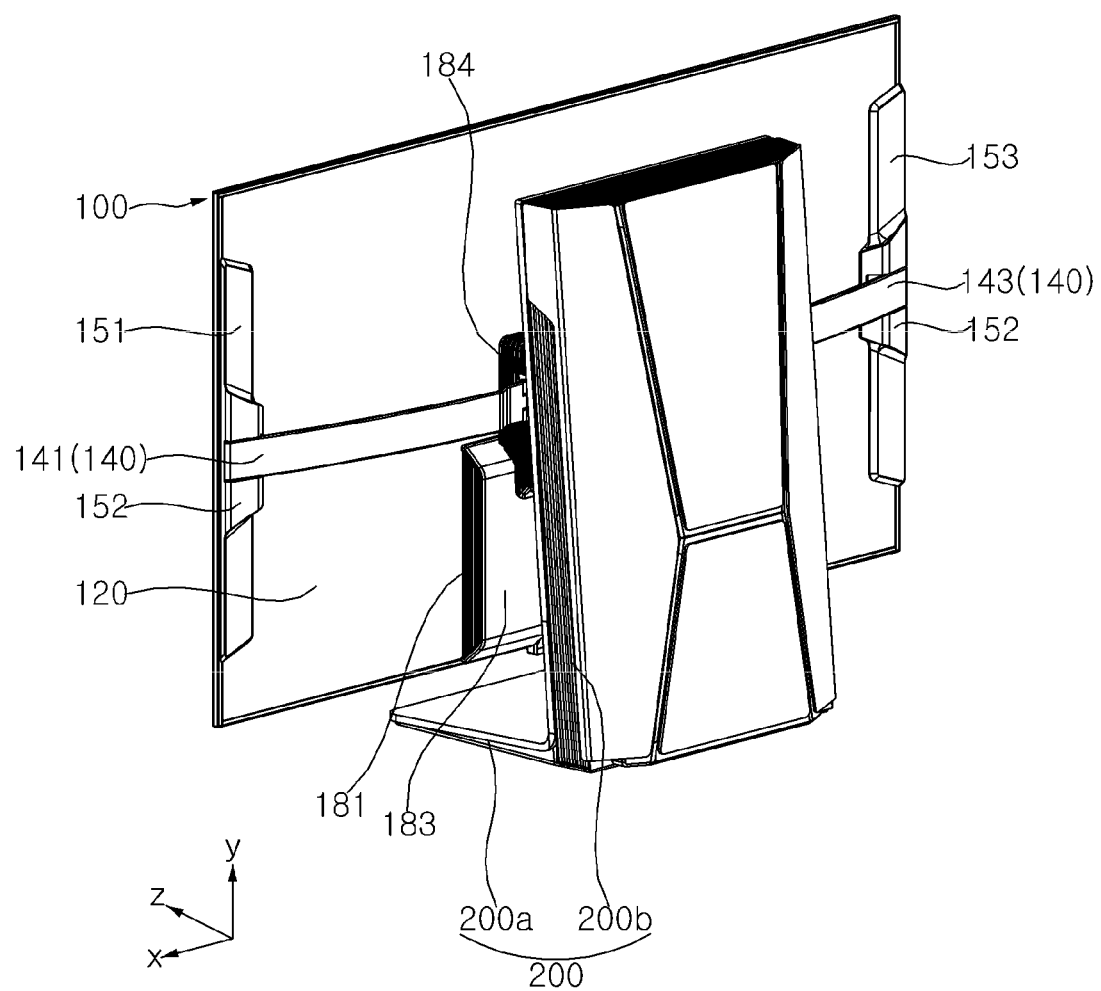

Referring to FIGS. 1 and 2, the display device 100 may include a plate 120. The plate 120 may define a rear surface of the display device 100.

A stand 200 may include a base 200a and a wall 200b. The base 200a may be placed on a ground or floor surface. The wall 200b may extend upward from a rear end of the base 200a. The wall 200b may be disposed at the rear of the plate 120, and may be coupled to the plate 120. Accordingly, the stand 200 may support the display device 100.

For example, electronic components such as a main board, a power supply board, a speaker, and the like may be installed in the wall 200b, and may be electrically connected to the display device 100.

Figure 3:
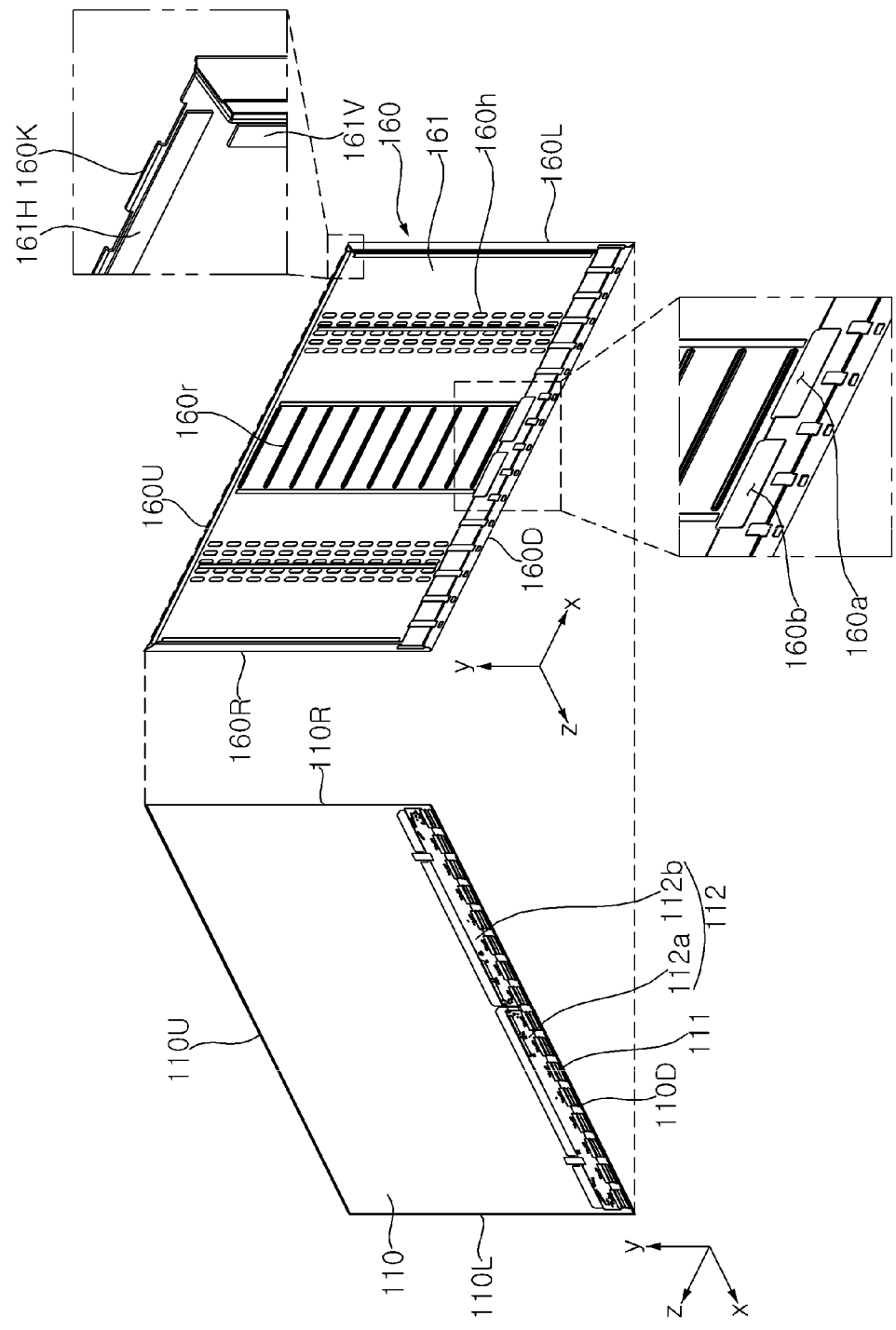

Referring to FIG. 3, the display panel 110 may be an OLED panel. The display panel 110 may define the front surface of the display device 100, and may display an image. The display panel 110 may divide an image into a plurality of pixels and output an image in accordance with color (hue), brightness (value), and saturation (chroma) of each pixel. The display panel 110 may produce light corresponding to a color of red, green, or blue according to a control signal.

A source PCB 112 may be adjacent to a lower side 110D of the display panel 110, and may extend along the lower side 110D. The source PCB 112 may be electrically connected to the display panel 110 through a source chip on film (COF) 111. The source PCB 112 may be electrically connected to a cable (not shown) such as a flexible flat cable (FFC). For example, a first source PCB 112a may extend to the left and right between a left side 110L of the display panel 110 and a central portion of the display panel 110, and may be electrically connected to a first FFC (not shown). For example, a second source PCB 112b may extend to the left and right between a right side 110R of the display panel 110 and the central portion of the display panel 110, and may be electrically connected to a second FFC (not shown).

An inner plate 160 may be disposed at the rear of the display panel 110. The inner plate 160 may have a shape that corresponds to the display panel 110. A cable hole 160a, 160b may be adjacent to a lower side 160D of the inner plate 160, and may be formed through the inner plate 160. A cable, such as a FFC, that is connected to the source PCB 112 may pass through the cable hole 160a, 160b.

A plurality of holes 160h may be disposed at the left or right, away from a central portion of the inner plate 160, may be sequentially disposed between an upper side 160U and the lower side 160D of the inner plate 160, and may be formed through the inner plate 160. A plurality of pressed parts 160r may be disposed at the central portion of the inner plate 160, may be sequentially disposed between the upper side 160U and the lower side 160D of the inner plate 160, and may be recessed from one surface (or a first surface) to another surface (or a second surface) of the inner plate 160.

A plurality of front adhesive members 161H and 161V may be coupled to a front surface 161 of the inner plate 160. Portions of the plurality of front adhesive members 161H and 161V may be adjacent to edges of the inner plate 160. Horizontal adhesive members 161H may extend horizontally. Vertical adhesive members 161V may extend vertically. For example, the plurality of front adhesive members 161H and 161V may be double-sided tapes.

Figure 4:
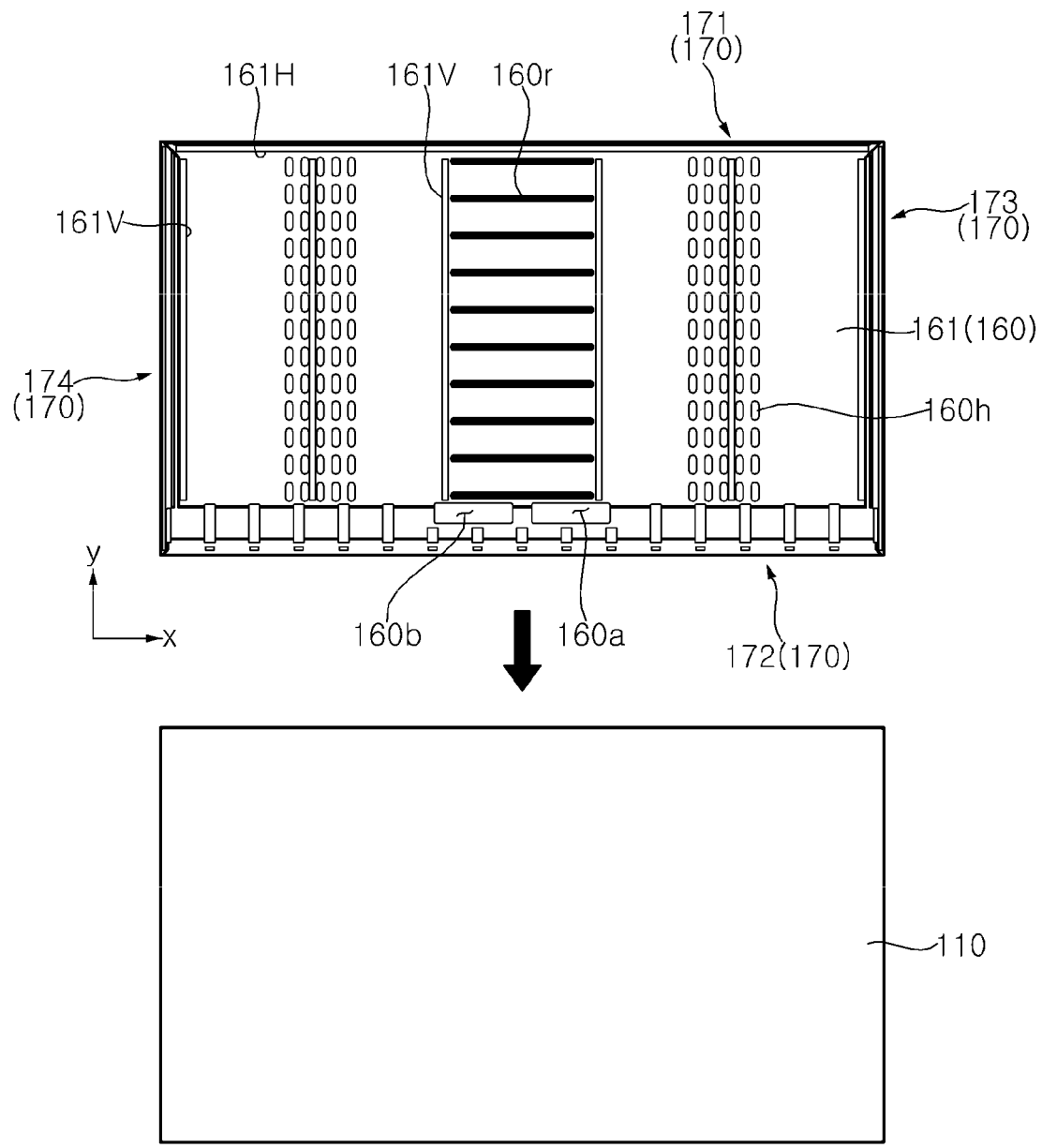

Referring to FIGS. 3 and 4, a rear surface of the display panel 110 may be disposed at the front of the front surface 161 of the inner plate 160, and may be coupled to the plurality of front adhesive members 161H and 161V. Accordingly, the display panel 110 may be coupled to the inner plate 160.

A first frame 171 may be adjacent to the upper side 160U of the inner plate 160, and may extend along the upper side 160U. The first frame 171 may cover the upper side 160U. The first frame 171 may be fixed to the inner plate 160 through an adhesive member such as a double-sided tape. The first frame 171 may be referred to as a top cover 171 or a top frame 171.

A second frame 172 may be adjacent to the lower side 160D of the inner plate 160, and may extend along the lower side 160D. The second frame 172 may cover the lower side 160D. The second frame 172 may be fixed to the inner plate 160 through an adhesive member such as a double-sided tape. The second frame 172 may be referred to as a bottom cover 172 or a bottom frame 172.

A third frame 173 may be adjacent to a left side 160L of the inner plate 160, and may extend along the left side 160L. The third frame 173 may cover the left side 160L. The third frame 173 may be fixed to the display panel 110 through an adhesive member such as a double-sided tape. The third frame 173 may be referred to as a side cover 173 or a side frame 173.

A fourth frame 174 may be adjacent to a right side 160R of the inner plate 160, and may extend along the right side 160R. The fourth frame 174 may cover the right side 160R. The fourth frame 174 may be fixed to the display panel 110 through an adhesive member such as a double-sided tape. The fourth frame 174 may be referred to as a side cover 174 or a side frame 174.

A frame 170 may define the edges of the display device 100. That is, the first frame 171 may define the first long side LS1, the second frame 172 may define the second long side LS2, the third frame 173 may define the second short side SS2, and the fourth frame 174 may define the first short side SS1 (see FIG. 1). The first frame 171, the second frame 172, the third frame 173, and the fourth frame 174 may be separated from each other at the corners C1, C2, C3, and C4 (see FIG. 1). The frame 170 may be referred to as a middle cabinet 170, a panel guide 170, an end cover 170, or a case top 170.

For example, the frame 170 may include a metal material such as aluminum (Al). In another example, the frame 170 may include a plastic or resin material.

Meanwhile, the third frame 173 and the fourth frame 174 may be fixed to the display panel 110. The first frame 171 and the second frame 172 may be fixed to the inner plate 160 to be bent or stretched together with the inner plate 160.

Figure 5:
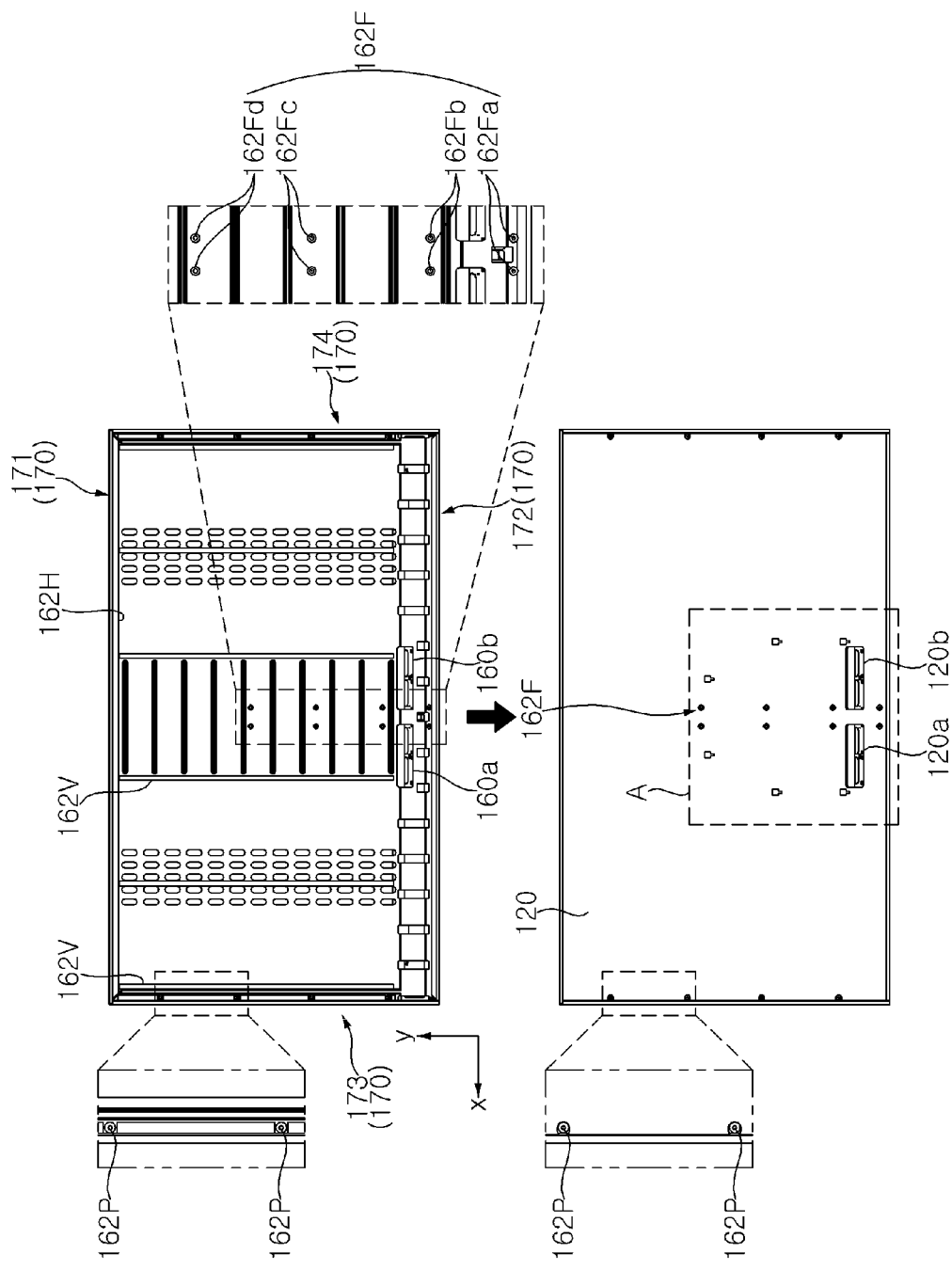

Referring to FIG. 5, a plurality of rear adhesive members 162H and 162V may be coupled to a rear surface 162 of the inner plate 160. Portions of the plurality of rear adhesive members 162H and 162V may be adjacent to the edges of the inner plate 160. Horizontal adhesive members 162H may extend horizontally. Vertical adhesive members 162V may extend vertically. For example, the plurality of rear adhesive members 162H and 162V may be double-sided tapes.

A front surface of the plate 120 may be disposed at the rear of the rear surface 162 of the inner plate 160, and may be coupled to the plurality of rear adhesive members 162H and 162V. Accordingly, the plate 120 may be coupled to the inner plate 160.

A cable hole 120a, 120b may be formed through the plate 120. The cable hole 120a, 120b of the plate 120 may be aligned with the cable hole 160a, 160b of the inner plate 160 in the front-and-rear direction.

A side fixing part 162P may protrude rearward from the rear surface 162 of the inner plate 160. The side fixing part 162P may be a PEM nut (or self-clinching nut). Among a plurality of side fixing parts 162P, side fixing parts adjacent to the left side of the inner plate 160 may be spaced apart from one another in the up-and-down direction, and may pass through the plate 120. Among the plurality of side fixing parts 162P, side fixing parts adjacent to the right side of the inner plate 160 may be spaced apart from one another in the up-and-down direction, and may pass through the plate 120. The side fixing parts 162P adjacent to the right side of the inner plate 160 may be referred to as first side fixing parts 162P, and the side fixing parts 162P adjacent to the left side of the inner plate 160 may be referred to as second side fixing parts 162P.

Figure 6:
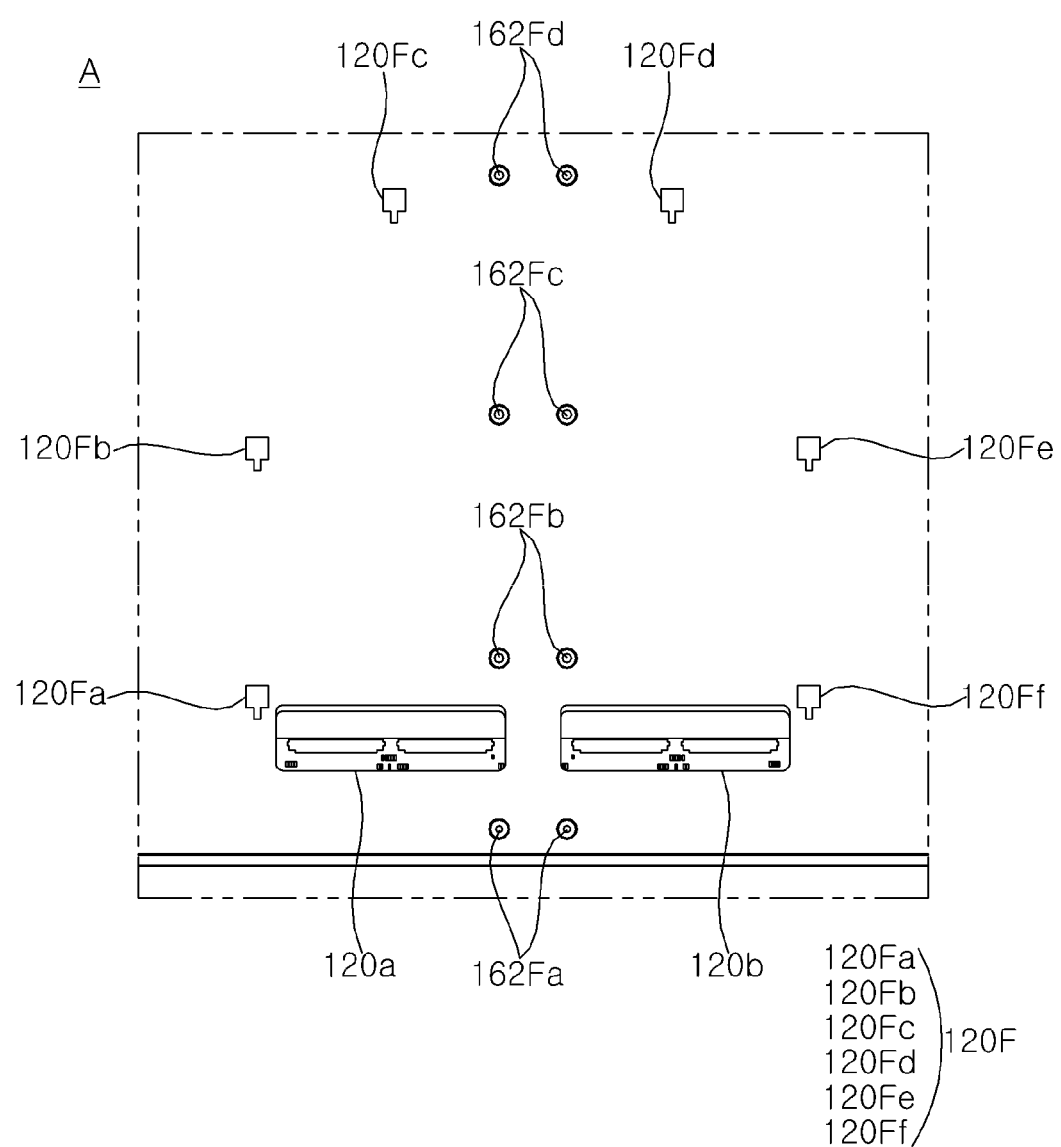

Referring to FIGS. 5 and 6, a center fixing part 162F may protrude rearward from the rear surface of the inner plate 160. The center fixing part 162F may be a PEM nut (or self-clinching nut). A plurality of center fixing parts 162F may be disposed at the central portion of the inner plate 160, may be spaced apart from one another in the up-and-down direction, and may pass through the plate 120. A pair of first center fixing parts 162Fa may be adjacent to the lower side of the inner plate 160. A pair of second center fixing parts 162Fb may be spaced upward from the pair of first center fixing parts 162Fa. A pair of third center fixing parts 162Fc may be spaced upward from the pair of second center fixing parts 162Fb. A pair of fourth center fixing parts 162Fd may be spaced upward from the pair of third center fixing parts 162Fc.

A locking recess 120F may be formed through the plate 120. A plurality of locking recesses 120F may be disposed in the vicinity of the plurality of center fixing part 162F. A first locking recess 120Fa, a second locking recess 120Fb, a third locking recess 120Fc, a fourth locking recess 120Fd, a fifth locking recess 120Fe, and a sixth locking recess 120Ff may be disposed in the vicinity of the plurality of center fixing parts 162F. An interval or distance between the first locking recess 120Fa and the sixth locking recess 120Ff may be equal to an interval between the second locking recess 120Fb and the fifth locking recess 120Fe, and may be greater than an interval between the third locking recess 120Fc and the fourth locking recess 120Fd.

Figure 7:
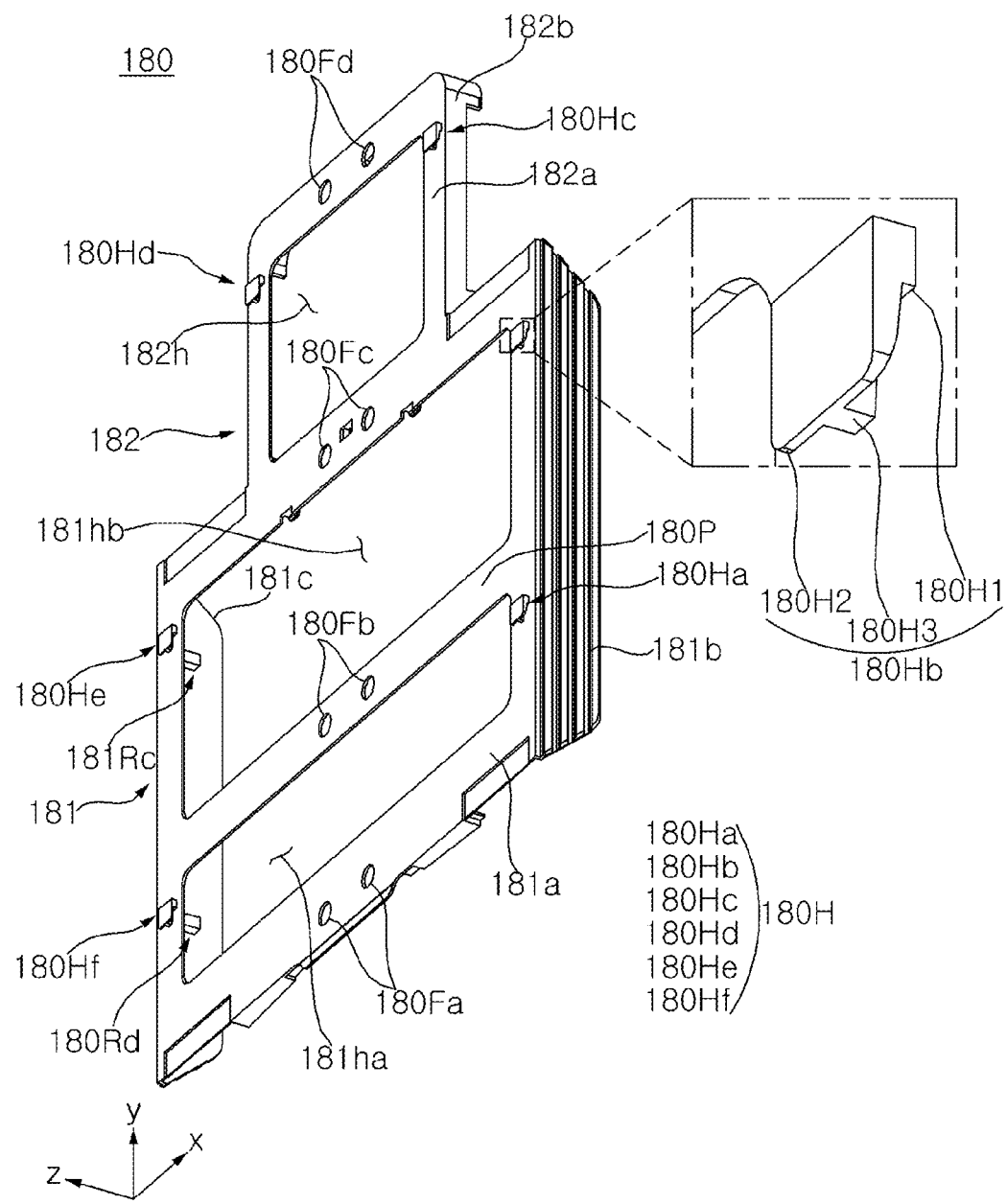
Figure 8:
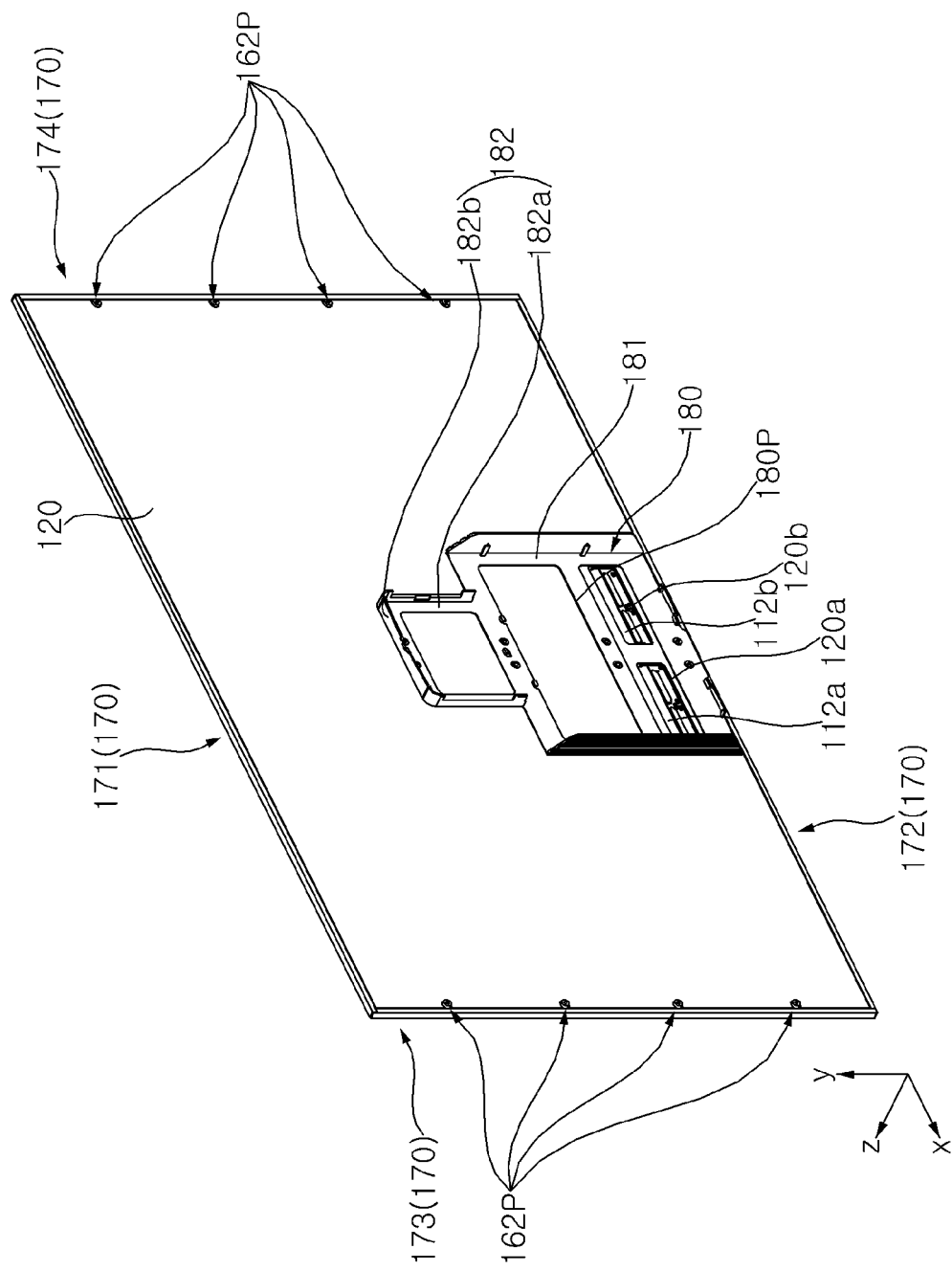

Referring to FIGS. 7 and 8, a bracket 180 may be disposed at the rear of the plate 120. The bracket 180 may be disposed at a central portion of the plate 120. The bracket 180 may be flexible. The bracket 180 may include a first bracket 181 and a second bracket 182. For example, the first bracket 181 and the second bracket 182 may be formed as one body.

The first bracket 181 may be adjacent to a lower side of the plate 120. A first bracket base 181a may define a flat portion of the first bracket 181, and may be open to the front and rear. A partition wall 180P may divide the opening of the first bracket base 181a into a first opening 181ha and a second opening 181hb. A first bending portion 181b may protrude rearward from a left side of the first bracket base 181a, and may extend vertically. A second bending portion 181c may protrude rearward from a right side of the first bracket base 181a, and may extend vertically. The first bending portion 181b may be referred to as a left bending portion 181b, and the second bending portion 181c may be referred to as a second bending portion 181c.

The second bracket 182 may extend upward from the first bracket 181. A size of the second bracket 182 may be less than a size of the first bracket 181. A second bracket base 182a may define a flat portion of the second bracket 182, and may be open to the front and rear (see 182h). A bending portion 182b may protrude rearward from upper, left, and right sides of the second bracket base 182a, and may extend along a periphery of the second bracket base 182a.

A locking protrusion 180H may protrude from a front surface of the bracket 180 toward the locking recess 120F (see FIG. 6). The locking protrusion 180H may include a protruding portion 180H1, a bending portion 180H2, and an insertion portion 180H3. The protruding portion 180H1 may protrude from the front surface of the bracket 180. The bending portion 180H2 may be bent downward from a front end of the protruding portion 180H1. The insertion portion 180H3 may be disposed between the front surface of the bracket 180 and the bending portion 180H2, may extend vertically, and may define a minimum width of the locking protrusion 180H. The locking protrusion 180H may be inserted into the locking recess 120F (see FIG. 6), and the protruding portion 180H1 of the locking protrusion 180H may be caught in or locked into the locking recess 120F.

For example, a plurality of locking protrusions 180H may be disposed along a periphery of the bracket 180. A first locking protrusion 180Ha and a second locking protrusion 180Hb may be adjacent to a left side of the first bracket 181, and a third locking protrusion 180Hc may be adjacent to a left side of the second bracket 182. A fourth locking protrusion 180Hd may be adjacent to a right side of the second bracket 182, and a fifth locking protrusion 180He and a sixth locking protrusion 180Hf may be adjacent to a right side of the first bracket 181. The first locking protrusion 180Ha may be caught in the first locking recess 120Fa, and the second locking protrusion 180Hb may be caught in the second locking recess 120Fb. The third locking protrusion 180Hc may be caught in the third locking recess 120Fc, and the fourth locking protrusion 180Hd may be caught in the fourth locking recess 120Fd. The fifth locking protrusion 180He may be caught in the fifth locking recess 120Fe, and the sixth locking protrusion 180Hf may be caught in the sixth locking recess 120Ff.

Accordingly, the bracket 180 may be coupled to the plate 120 in a hook manner.

A fixing hole 180Fa, 180Fb, 180Fc, 180Fd may be formed through the bracket 180, and may be disposed at a central portion of the bracket 180. The fixing hole 180Fa, 180Fb, 180Fc, 180Fd may be aligned with the center fixing part 162Fa, 162Fb, 162Fc, and 162Fd (see FIG. 6). A pair of first fixing holes 180Fa may be aligned with the pair of first center fixing parts 162Fa, and a pair of second fixing holes 180Fb may be aligned with the pair of second center fixing parts 162Fb. A pair of third fixing holes 180Fc may be aligned with the pair of third center fixing parts 162Fc, and a pair of fourth fixing holes 180Fd may be aligned with the pair of fourth center fixing parts 162Fd. A fastening member such as a screw may pass through the fixing hole 180Fa, 180Fb, 180Fc, 180Fd to be fastened to the center fixing part 162Fa, 162Fb, 162Fc, 162Fd.

Accordingly, the bracket 180 may be screw-fastened to the plate 120.

Figure 9:
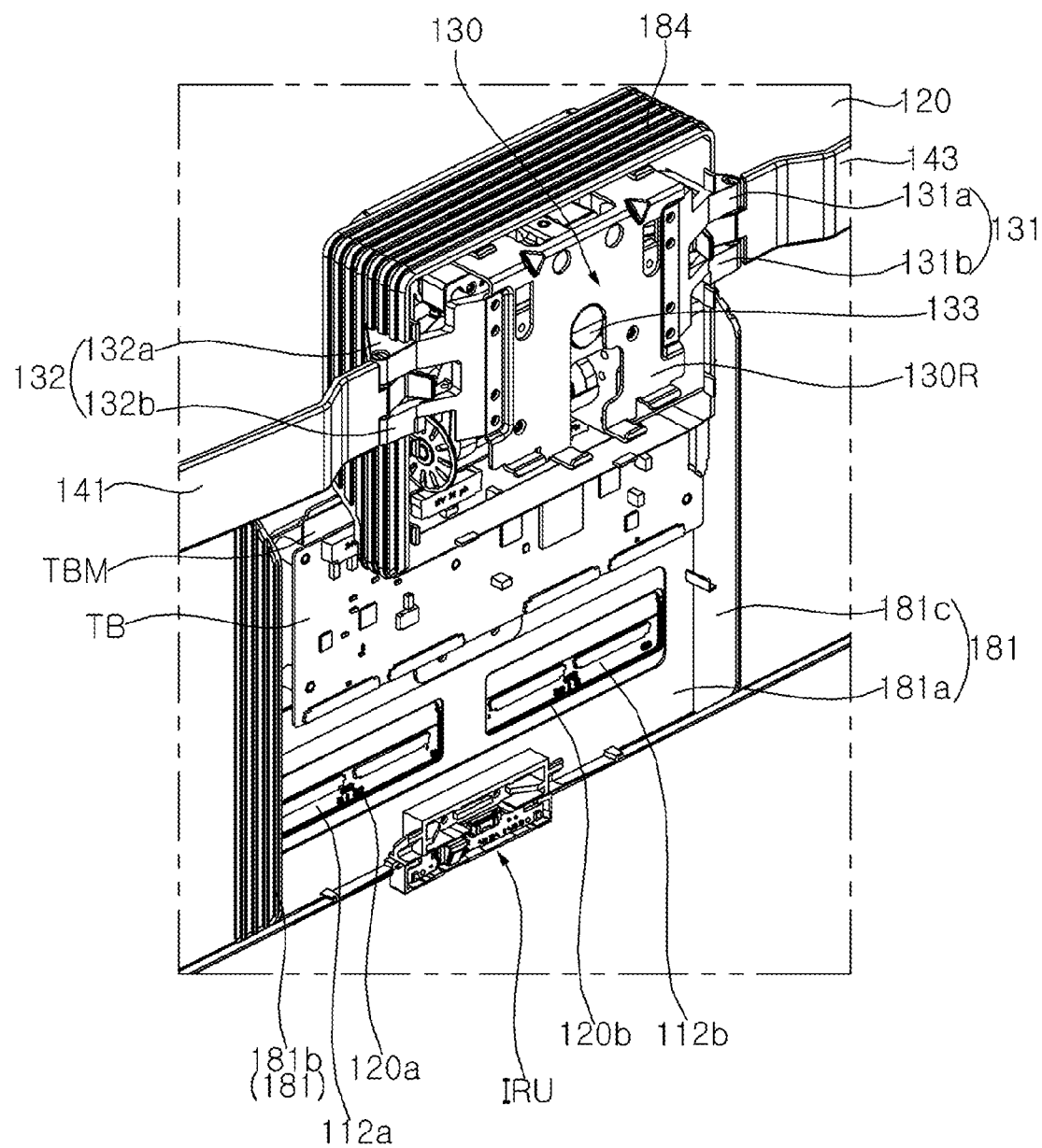

Referring to FIGS. 8 and 9, a timing controller board TB may be coupled to the first bracket base 181a through a mount plate TBM. The first FFC (not shown) that is connected to the first source PCB 112a may be connected to the timing controller board TB through a first cable hole 120a and the first opening 181ha (see FIG. 7). The second FFC (not shown) that is connected to the second source PCB 112b may be connected to the timing controller board TB through a second cable hole 120b and the first opening 181ha (see FIG. 7).

An upper cover 184 may be coupled to the second bracket base 182a. The upper cover 184 may extend along the bending portion 182b.

A drive module 130 may be disposed in the upper cover 184. A rear bracket 130R of the drive module 130 may be disposed opposite a front bracket 130F (see FIG. 14), which will be described later, with respect to a lead screw 133. The lead screw 133 may connect the front bracket 130F and the rear bracket 130R. One end (or a first end) of a first wing bracket 131 may be coupled to the front bracket 130F, and another end (or a second end) of the first wing bracket 131 may be coupled to the rear bracket 130R. One end (or a first end) of a second wing bracket 132 may be coupled to the front bracket 130F, and another end (or a second end) of the second wing bracket 132 may be coupled to the rear bracket 130R.

Figure 10:
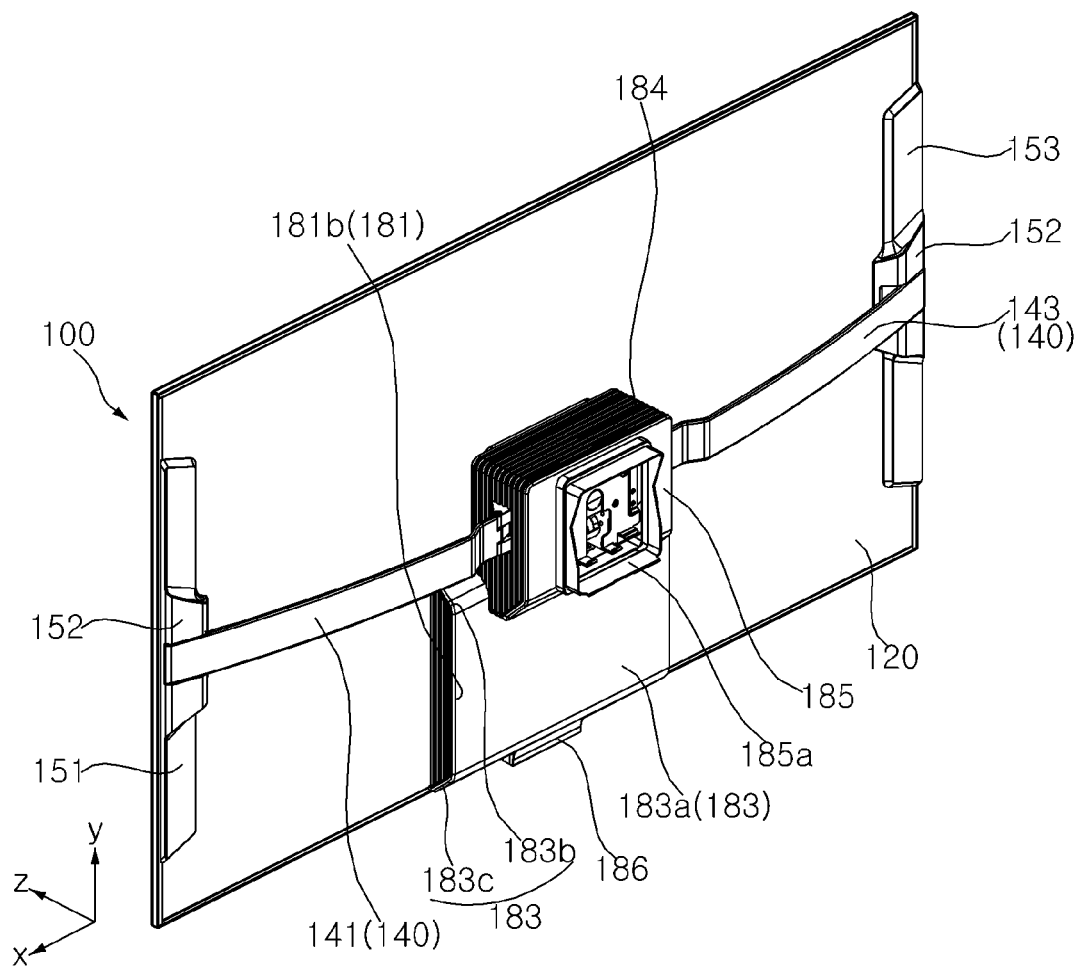

Referring to FIGS. 9 and 10, a rear cover 185 may be disposed at the rear of the drive module 130, and may be coupled to the rear bracket 130R. A rear hole 185a may be formed through the rear cover 185. The wall 200b of the stand 200 described above with reference to FIGS. 1 and 2 may be coupled to the rear bracket 130R through the rear hole 185a. In addition, a cable and the like may be connected to the display device 100 and the wall 200b of the stand 200 through the rear hole 185a.

A rear cover 183 may be disposed at the rear of the timing controller board TB, and may be coupled to the first bracket 181. The rear cover 183 may cover the timing controller board TB. The rear cover 183 may also be referred to as a lower cover 183.

Meanwhile, a first side frame 153 may be adjacent to a right side of the plate 120, and may be coupled to a rear surface of the plate 120. A first wing 143 may be coupled to the first side frame 153 through a sliding mount 152, and may be pivotally connected to the first wing bracket 131.

A second side frame 151 may be adjacent to a left side of the plate 120, and may be coupled to the rear surface of the plate 120. A second wing 141 may be coupled to the second side frame 151 through a sliding mount 152, and may be pivotally connected to the second wing bracket 132.

Figure 11:
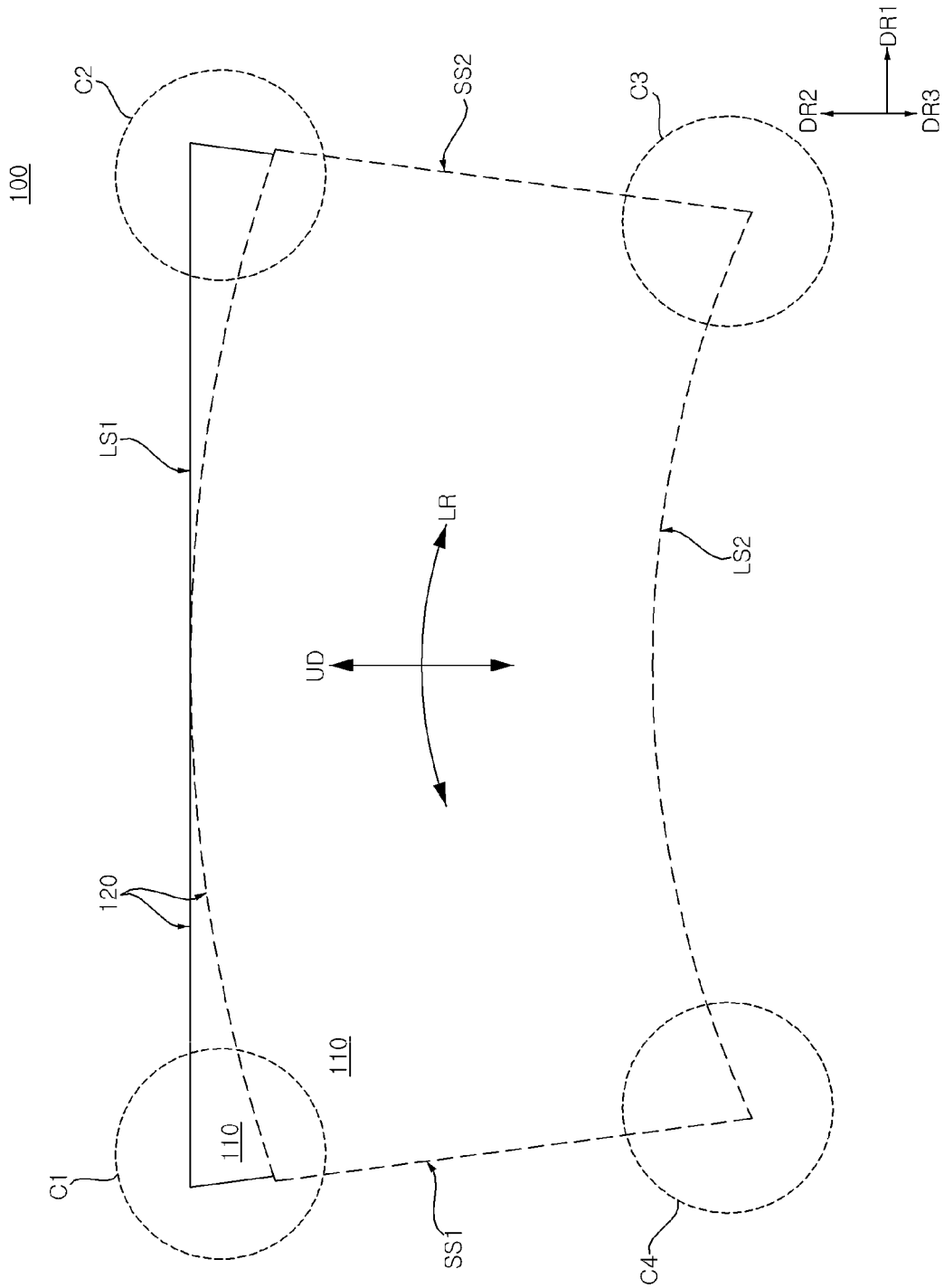

Referring to FIG. 11, the plate 120 may be flexible. For example, the plate 120 may be a metal plate. The plate 120 may be referred to as a flexible plate 120, a frame 120, or a module cover 120. The display panel 110 may be disposed at the front or on the front surface of the plate 120. The display panel 110 may be flexible. For example, the display panel 110 may be an OLED panel. The inner plate 160 and the frame 170 may be flexible (see FIG. 5). For example, the inner plate 160 may be a metal plate.

The display panel 110 may define the front surface of the display device 100, and may display an image. The display panel 110 may divide an image into a plurality of pixels and output an image in accordance with color (hue), brightness (value), and saturation (chrome) of each pixel. The display panel 110 may produce light corresponding to a color of red, green, or blue according to a control signal.

The display device 100 may have a variable curvature. Left and right sides of the display device 100 may move forward. The left side of the display device 100 and the right side of the display device 100 may be opposite each other in a curved direction of the display device 100. For example, when an image is viewed from the front of the display device 100, the display device 100 may be curved concavely or inwardly. Here, the plate 120 may be bent with the same curvature as the display panel 110. Alternatively, the display panel 110 may be bent to correspond to a curvature of the plate 120.

Figure 12:
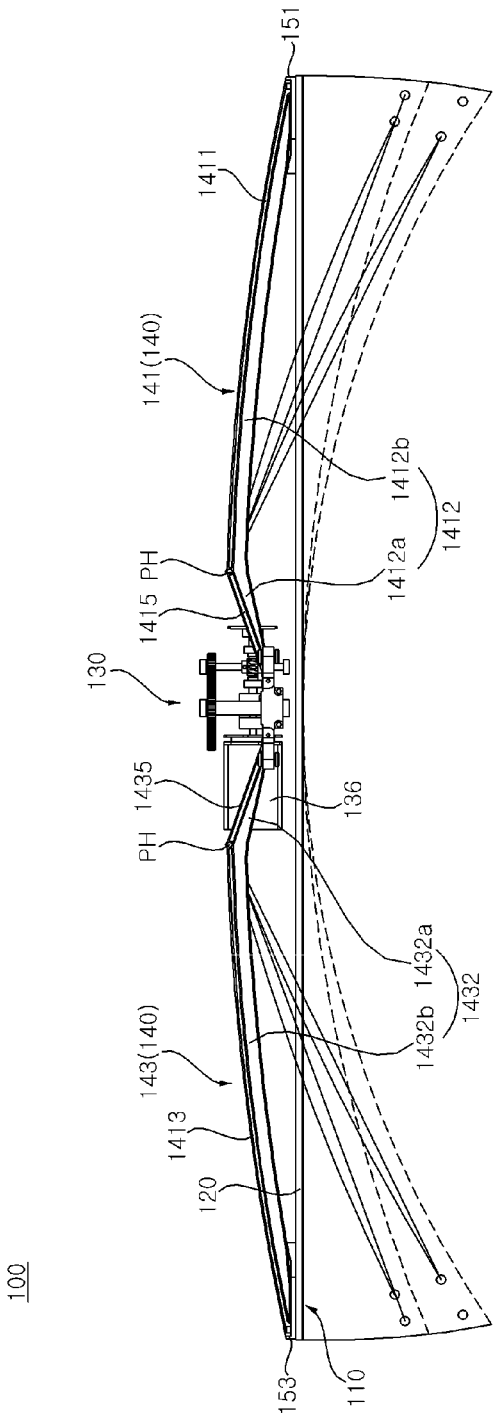
Figure 13:
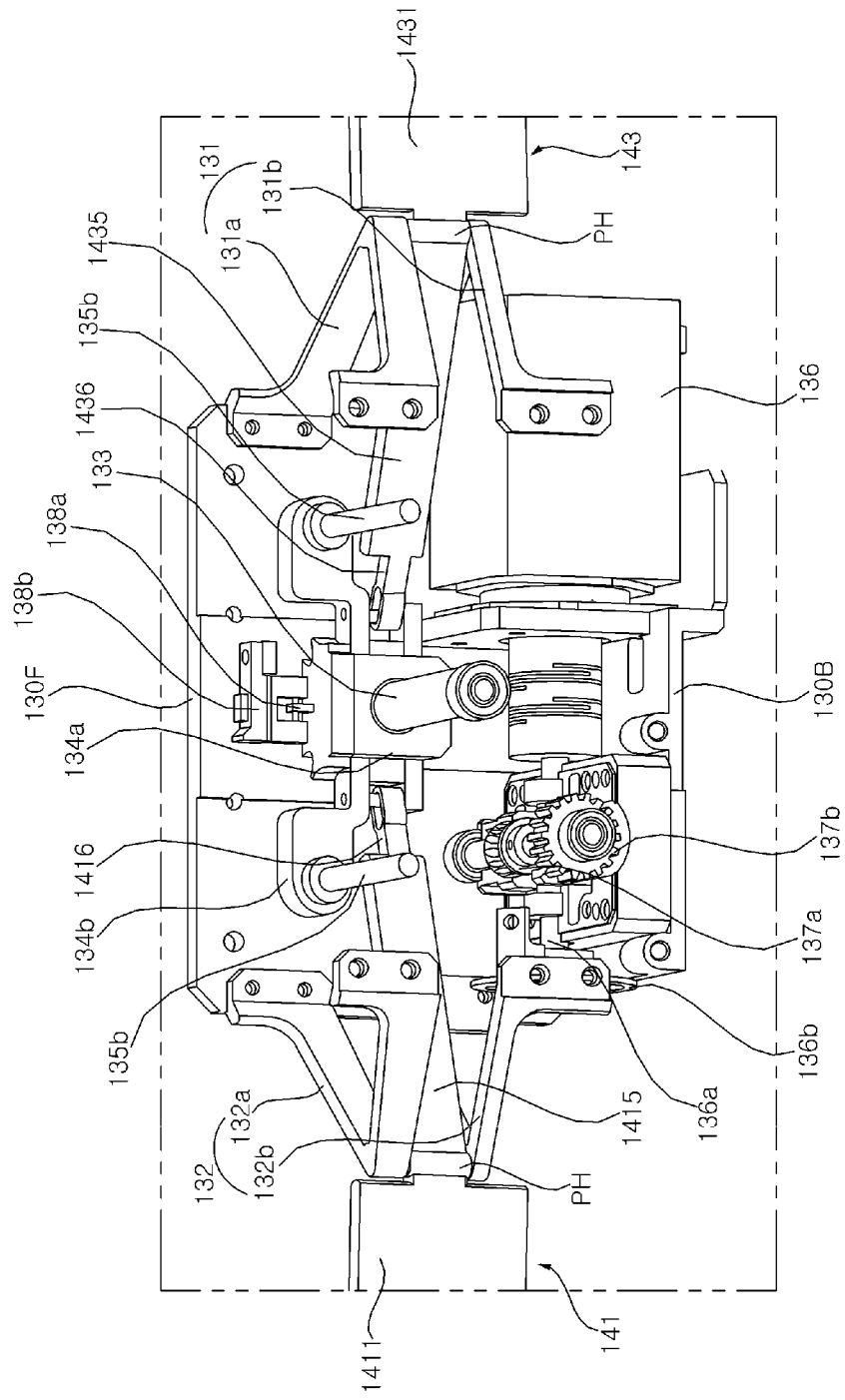

Referring to FIGS. 12 and 13, the plate 120 may have a shape that corresponds to the display panel 110, and may be coupled to the rear of the display panel 110.

The drive module 130 may be coupled to the rear of the plate 120. The drive module 130 may include the front bracket 130F, a base 130B, and the wing bracket 131, 132.

The front bracket 130F may be coupled or fixed to the rear or the rear surface of the plate 120. The front bracket 130F may have a flat rectangular plate shape. The base 130B may be coupled or fixed to the front bracket 130F, and may define a bottom of the drive module 130.

A plurality of wing brackets 131 and 132 may be provided. The plurality of wing brackets 131 and 132 may include the first wing bracket 131 and the second wing bracket 132. The first wing bracket 131 may be coupled or fixed to the front bracket 130F, and may be opposite the second wing bracket 132. The second wing bracket 132 may also be coupled or fixed to the front bracket 130F.

The wing bracket 131, 132 may have a V-shape. The wing bracket 131, 132 may be provided in pair. An upper bracket 131a, 132a of the wing bracket 131, 132 may be disposed in parallel with a lower bracket 131b, 132b of the wing bracket 131, 132. A pin (refer to the pin P of FIG. 17) may be disposed between the upper bracket 131a, 132a and the lower bracket 131*b*, 132*b*. The pin may connect vertices of the upper bracket 131*a*, 132*a* and the lower bracket 131*b*, 132*b*.

The first wing 143 may be pivotally connected to the first wing bracket 131. The second wing 141 may be pivotally connected to the second wing bracket 132. The first wing 143 and the second wing 141 may be line-symmetric with respect to the drive module 130. The descriptions of the first wing 143 and the first wing bracket 131 may be equally applied to the second wing 141 and the second wing bracket 132 (and vice versa). The first wing 143 may include a wing plate 1431, a pivot shaft PH, and a lever 1435.

A wing plate 1411, 1431 may be an elongated plate. A lever 1415, 1435 may extend from one end of the wing plate 1411, 1431. The lever 1415, 1435 may be an elongated plate. A length of the lever 1415, 1435 may be less than a length of the wing plate 1411, 1431, and a width of the lever 1415, 1435 may be less than a width of the wing plate 1411, 1431. A thickness of the wing plate 1411, 1431 may be substantially equal to a thickness of the lever 1415, 1435.

A pivot shaft PH may be pivotally connected to the pin of the wing bracket 131, 132. The pin may be inserted into the pivot shaft PH of the wing 141, 143. The wing 141, 143 may pivot on the wing bracket 131, 132 about the pin.

Figure 14:
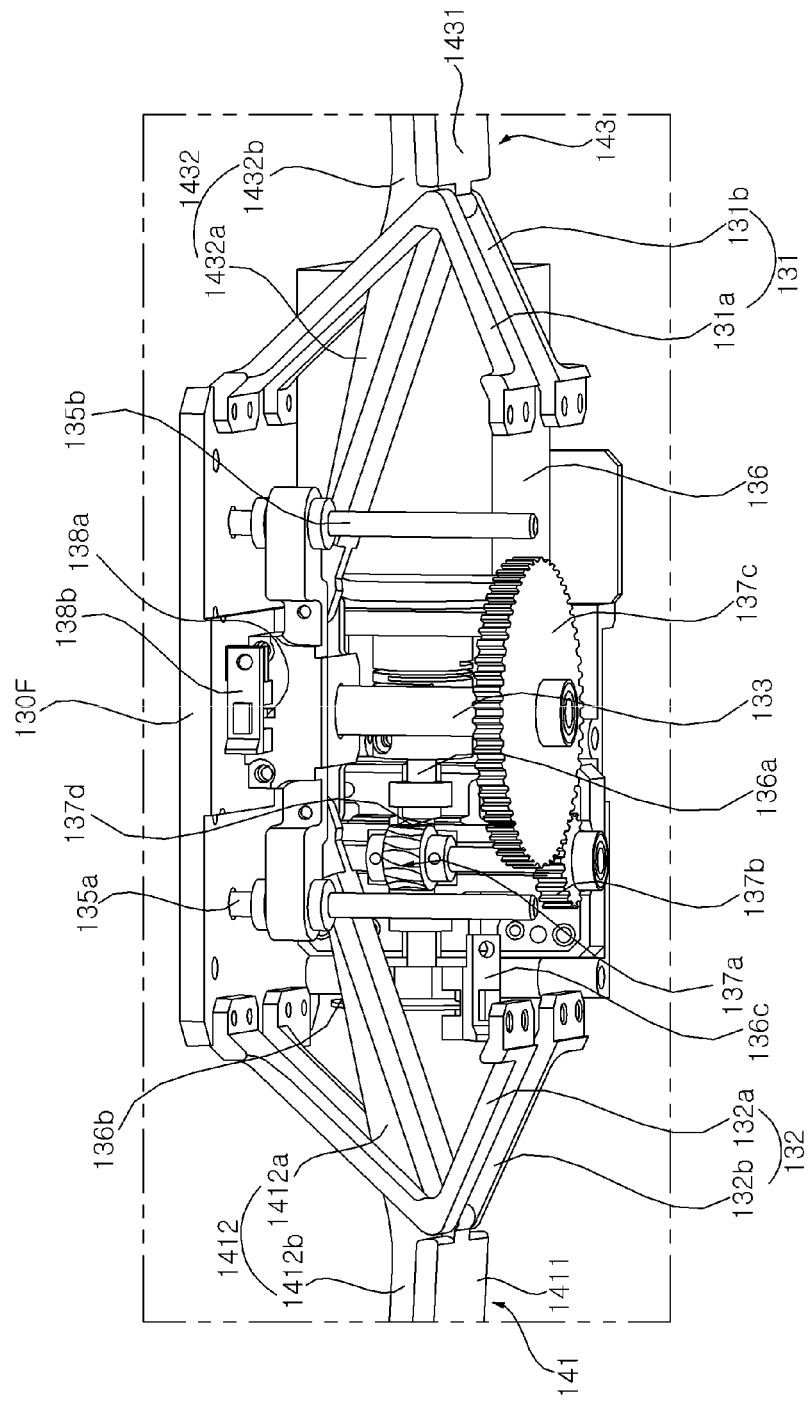

Referring to FIGS. 13 and 14, the lead screw 133 may be rotatably installed to the front bracket 130F. For example, the lead screw 133 may be elongated, and may have a thread on an outer surface thereof. The lead screw 133 may be inserted into a slider 134*a*. The slider 134*a* and the lead screw 133 may be threadedly coupled to each other. When the lead screw 133 rotates, the slider 134*a* may reciprocate in a longitudinal direction of the lead screw 133.

A slider guide 134*b* may be fixed on the slider 134*a*. The slider guide 134*b* may move together with the slider 134*a*. A guide shaft 135*a*, 135*b* may be coupled or fixed to the front bracket 130F. The guide shaft 135*a*, 135*b* may be parallel to the lead screw 133. The guide shaft 135*a*, 135*b* may include a first guide shaft 135*a* and a second guide shaft 135*b*. The first guide shaft 135*a* may be disposed opposite the second guide shaft 135*b* with respect to the lead screw 133. The guide shaft 135*a*, 135*b* may be inserted into the slider guide 134*b*. Accordingly, when the lead screw 133 rotates, the slider 134*a* may reciprocate in the longitudinal direction of the lead screw 133 in a stable manner.

A motor 136 may be mounted on the base 130B. The motor 136 may be an electric motor. The motor 136 may be a step motor. The motor 136 may control the number of steps corresponding to a rotation angle, a direction of rotation, and a rotational speed. A rotating shaft 136*a* of the motor 136 may intersect the longitudinal direction of the lead screw 133. The motor 136 and the rotating shaft 136*a* of the motor 136 may be disposed between the lead screw 133 and the base 130B. A worm 137*d* may be fixed to the rotating shaft 136*a* of the motor 136, and may rotate together with the rotating shaft 136*a* of the motor 136. A worm gear 137*a* may mesh with the worm 137*d*. A transmission gear 137*b* may rotate coaxially with the worm gear 137*a*. A drive gear 137*c* may be fixed to one end of the lead screw 133 to rotate together with the lead screw 133. The drive gear 137*c* may mesh with the transmission gear 137*b*. A diameter of the drive gear 137*c* may be greater than a diameter of the transmission gear 137*b*.

Figure 15:
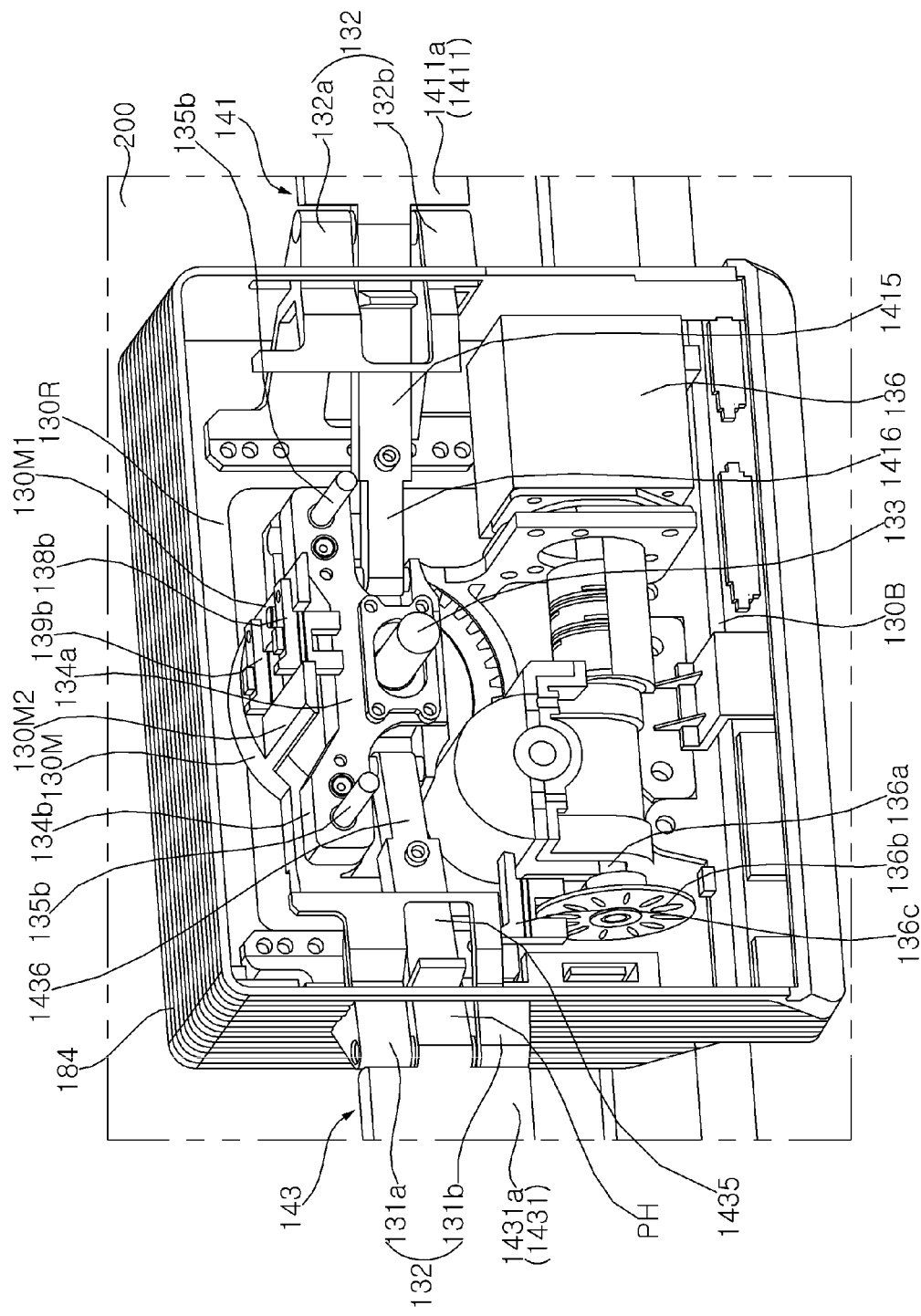

Referring to FIG. 15, a disc indicator 136*b* may be adjacent to a distal end of the rotating shaft 136*a* of the motor 136, and may be fixed to the rotating shaft 136*a*. The disc indicator 136*b* may include a plurality of holes (no reference numeral) spaced apart from one another in a circumferential direction of the disc indicator 136*b*.

A counter sensor 136*c* may be adjacent to the disc indicator 136*b*, and may be fixed to the base 130B or the second wing bracket 132. The counter sensor 136*c* may be a photo sensor. The counter sensor 136*c* may have a horseshoe shape. A light-emitting portion and a light-receiving portion of the counter sensor 136*c* may be spaced apart from each other while facing each other. When the rotating shaft 136*a* rotates, the disc indicator 136*b* may rotate while passing between the light-emitting portion and the light-receiving portion of the counter sensor 136*c*. In response to the rotation of the disc indicator 136*b*, light of the light-emitting portion of the counter sensor 136*c* may pass through the holes of the disc indicator 136*b* or may be blocked by the disc indicator 136*b*.

Accordingly, the counter sensor 136*c* may detect the number of rotations and/or the amount of rotation of the motor 136.

A mount 130M may be adjacent to an outer circumference of the drive gear 137*c*, and may be fixed to the rear bracket 130R. An extension portion 130M1, 130M2 may extend from the mount 130M in a direction parallel to the lead screw 133. The extension portion 130M1, 130M2 may be disposed on an upper side of the slider 134*a* or an upper side of the slider guide 134*b*.

A pin indicator 138*a* (see FIG. 14) may be fixed on the slider 134*a* or the slider guide 134*b*. The pin indicator 138*a* may have a pin shape.

A first sensor 138*b* may be coupled to the extension portion 130M1. Alternatively, the first sensor 138*b* may be coupled to the front bracket 130F. The first sensor 138*b* may be a photo sensor. The first sensor 138*b* may have a horseshoe shape. A light-emitting portion and a light-receiving portion of the first sensor 138*b* may be spaced apart from each other while facing each other. The pin indicator 138*a* may pass between the light-emitting portion and the light-receiving portion of the first sensor 138*b* as the slider 134*a* performs a linear reciprocating motion. In response to the movement of the pin indicator 138*a*, light of the light-emitting portion of the first sensor 138*b* may be provided to the light receiving-portion of the first sensor 138*b* or may be blocked by the pin indicator 138*a*.

Accordingly, the first sensor 138*b* may detect the approach of the pin indicator 138*a*. When the slider 134*a* is located closer to the front bracket 130F, the first sensor 138*b* may detect the pin indicator 138*a* (see FIGS. 16 and 17). At this time, as will be described later with reference to FIGS. 18 to 20, the plate 120 and the display panel 110, which are coupled to the slider 134*a* through the wing 141, 143 and the side frame 151, 153, may have a minimum curvature, and this position may be referred to as a start point of the slider 134*a*. For example, the minimum curvature may be 'zero (0)', and accordingly the display panel 110 may be flat.

A second sensor 139*b* may be spaced rearward from the first sensor 138*b*, and may be coupled to the extension portion 130M1. Alternatively, the second sensor 139*b* may be coupled to the rear bracket 130R. The second sensor 139*b* may be a photo sensor. The second sensor 139*b* may have a horseshoe shape. A light-emitting portion and a light-receiving portion of the second sensor 139*b* may be spaced apart from each other while facing each other. The pin indicator 138*a* may pass between the light-emitting portion and the light-receiving portion of the second sensor 139*b* as the slider 134*a* performs a linear reciprocating motion. In response to the movement of the pin indicator 138*a*, light of the light-emitting portion of the second sensor 139*b* may be provided to the light-receiving portion of the second sensor 139*b* or may be blocked by the pin indicator 138*a*.

Accordingly, the second sensor 139*b* may detect the approach of the pin indicator 138*a*. When the slider 134*a* is located closer to the rear bracket 130R, the second sensor 139*b* may detect the pin indicator 138*a* (see FIGS. 16 and 17). At this time, as will be described later with reference to FIGS. 18 to 20, the plate 120 and the display panel 110, which are coupled to the slider 134*a* through the wing 141, 143 and the side frame 151, 153, may have a maximum curvature, and this position may be referred to as a terminal point of the slider 134*a*. For example, a minimum radius of curvature may be 1,000 mm, 800 mm, or 700 mm.

The display device may include at least one of the counter sensor 136*c*, the first sensor 138*b*, and the second sensor 139*b*.

Figure 16:
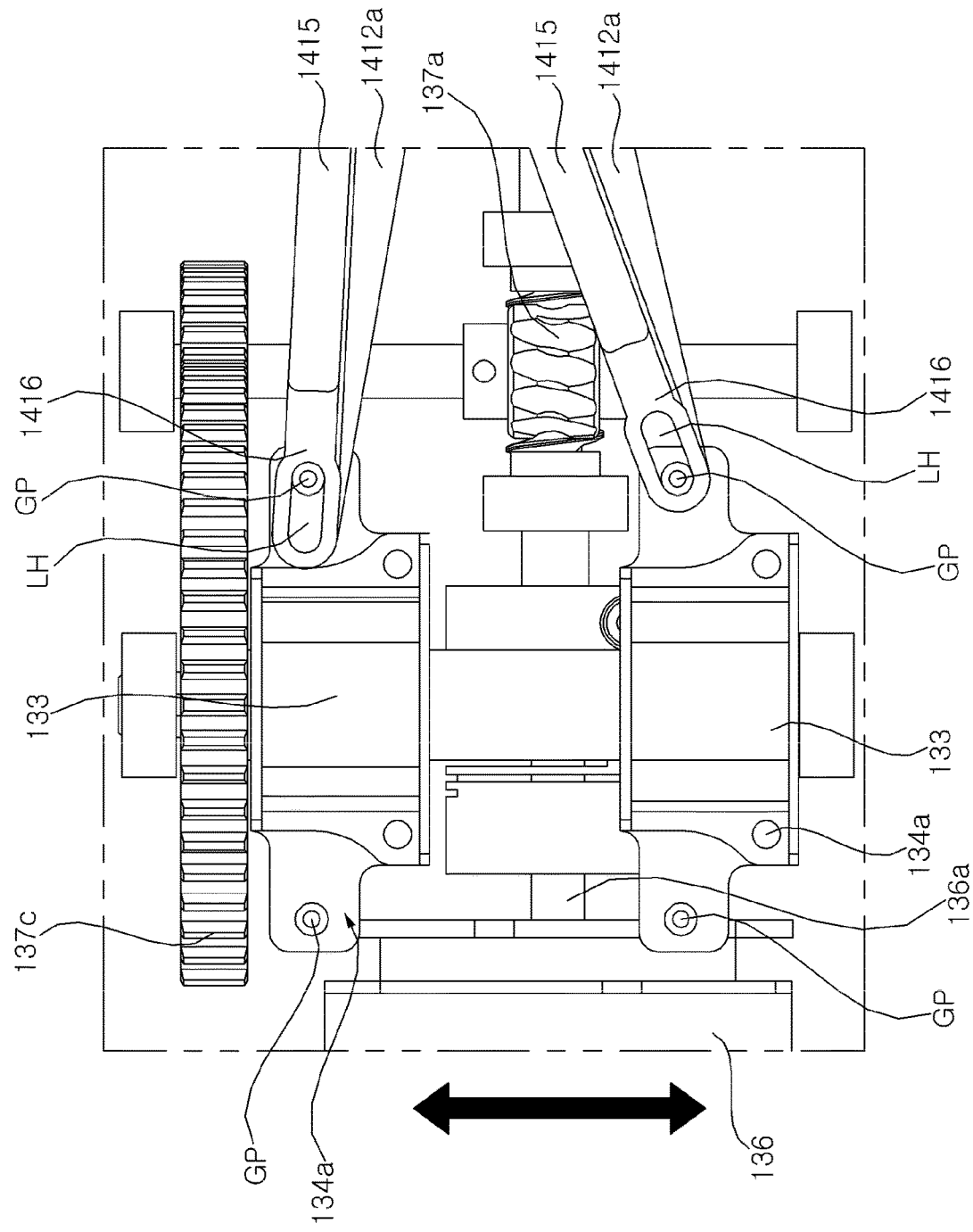
Figure 17:
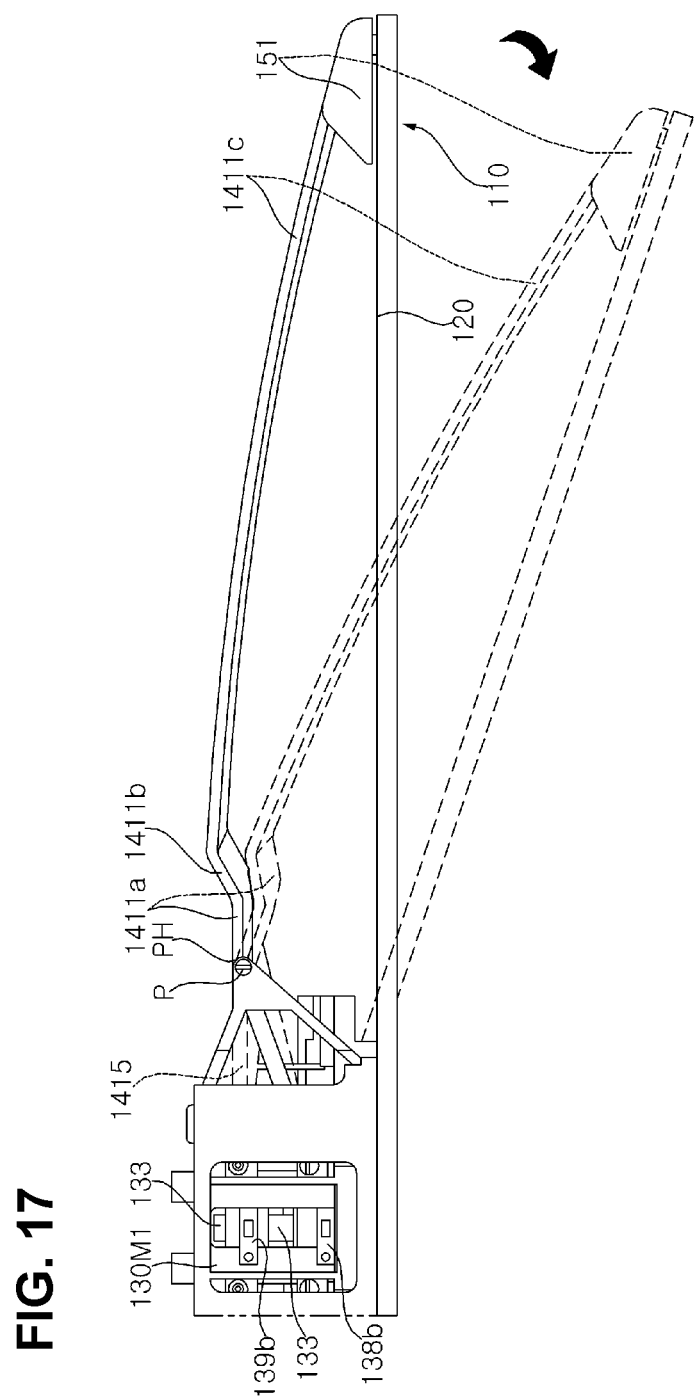

Referring to FIGS. 16 and 17, the wing plate 1411 may include a first part 1411*a*, a second part 1411*b*, and a third part 1411*c*. The first part 1411*a* may be disposed opposite the lever 1415 with respect to the pivot shaft PH. The first part 1411*a* may be bent at the lever 1415, and may form an obtuse angle with respect to the lever 1415. The second part 1411*b* may be bent at the first part 1411*a*, may be substantially parallel to the lever 1415, and may form an obtuse angle with respect to the first part 1411*a*. The third part 1411*c* may be bent at the second part 1411*b*, may be substantially parallel to the first part 1411*a*, and may form an obtuse angle with respect to the second part 1411*b*.

The second wing 141 may include a connecting rod 1416. The connecting rod 1416 may be fixed to or extend from the lever 1415. The connecting rod 1416 may be connected to the slider 134*a*. The connecting rod 1416 may be pivotally connected to the slider 134*a*. The connecting rod 1416 may include a long hole LH. The long hole LH may be formed on a distal end of the connecting rod 1416 that is adjacent to the slider 134*a*. The slider 134*a* may include a connecting pin GP. The connecting pin GP may have a cylindrical shape. A diameter of the connecting pin GP may be substantially the same as a width of the long hole LH.

When the lead screw 133 rotates, the slider 134*a* may reciprocate in the longitudinal direction of the lead screw 133. The lever 1415 that is connected to the slider 134*a* by the connecting rod 1416 may move together with the slider 134*a*, and the second wing 141 may pivot about the pivot shaft PH. Here, the connecting pin GP may move inside the long hole LH.

Figure 18:
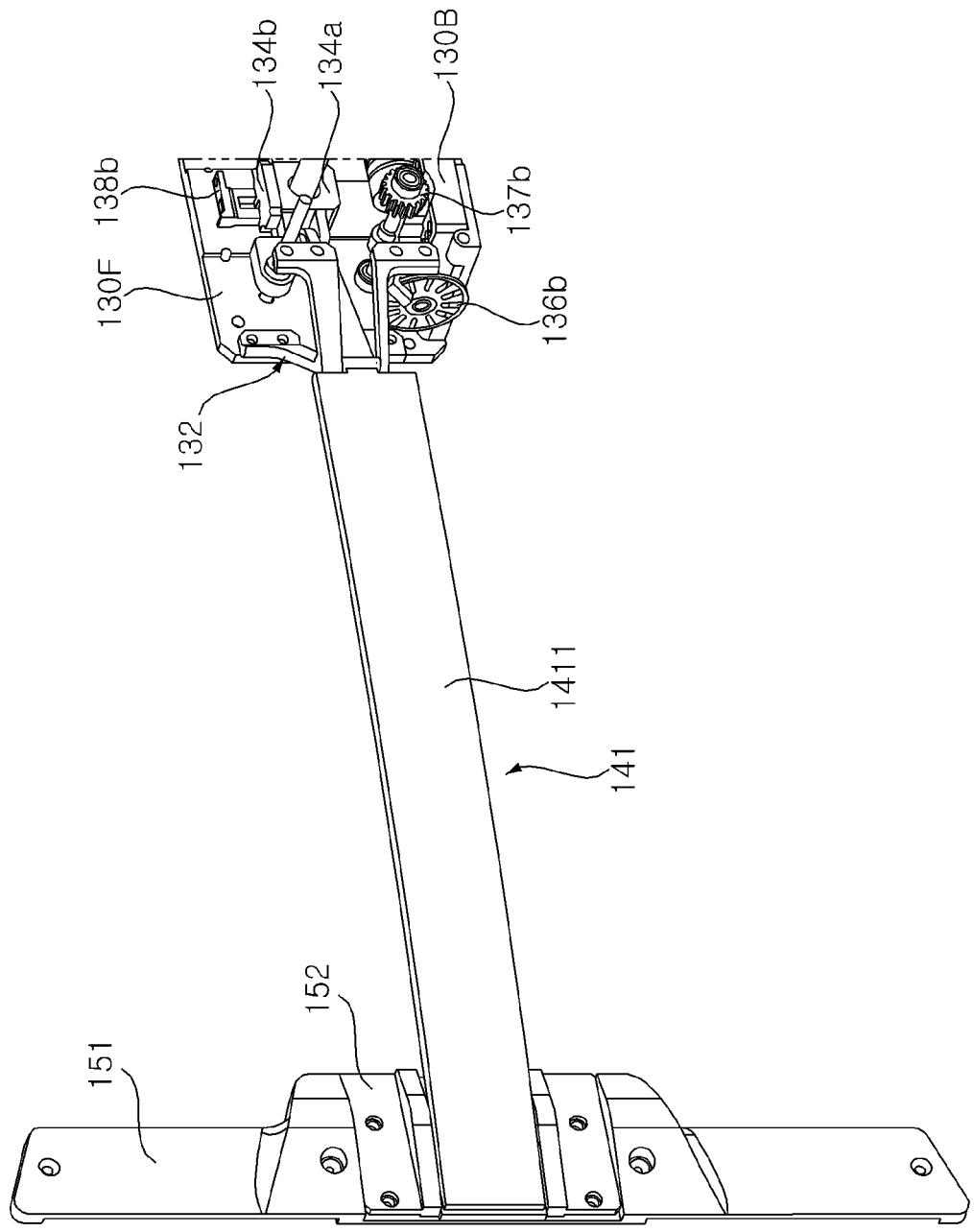
Figure 19:
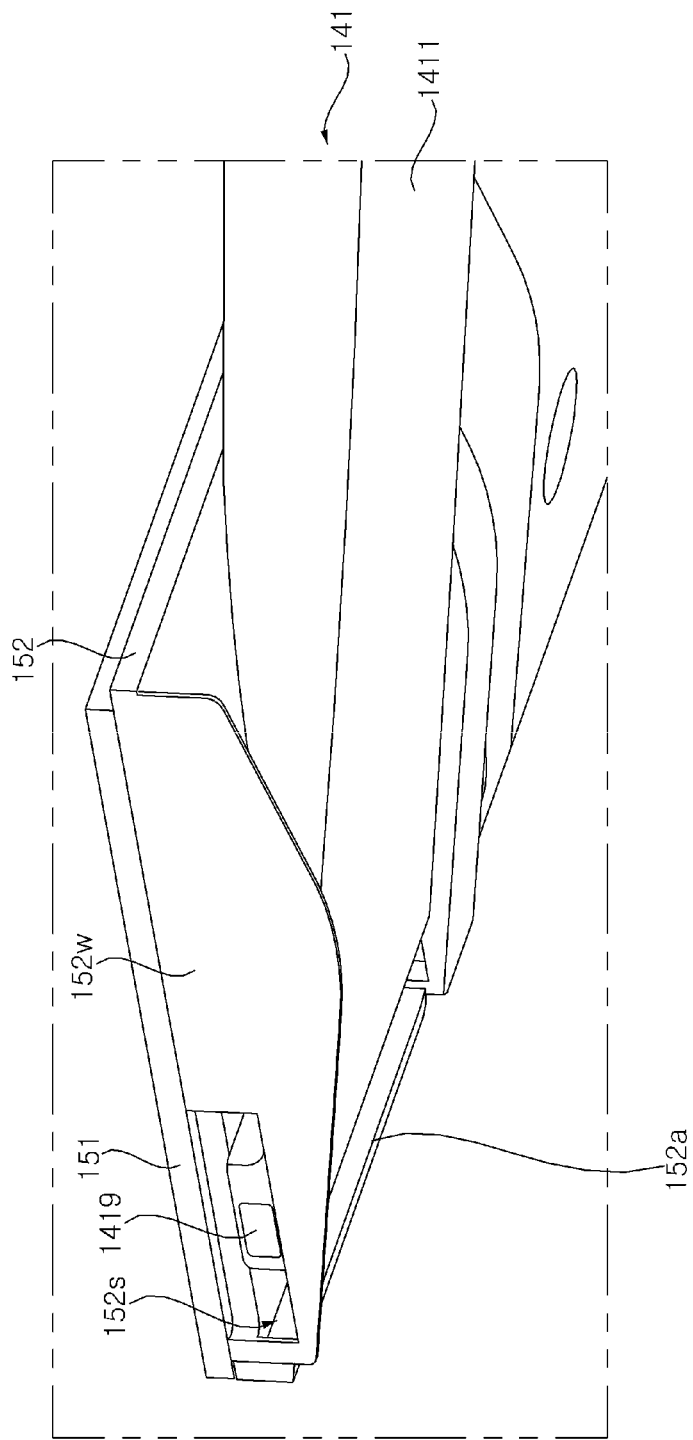
Figure 20:
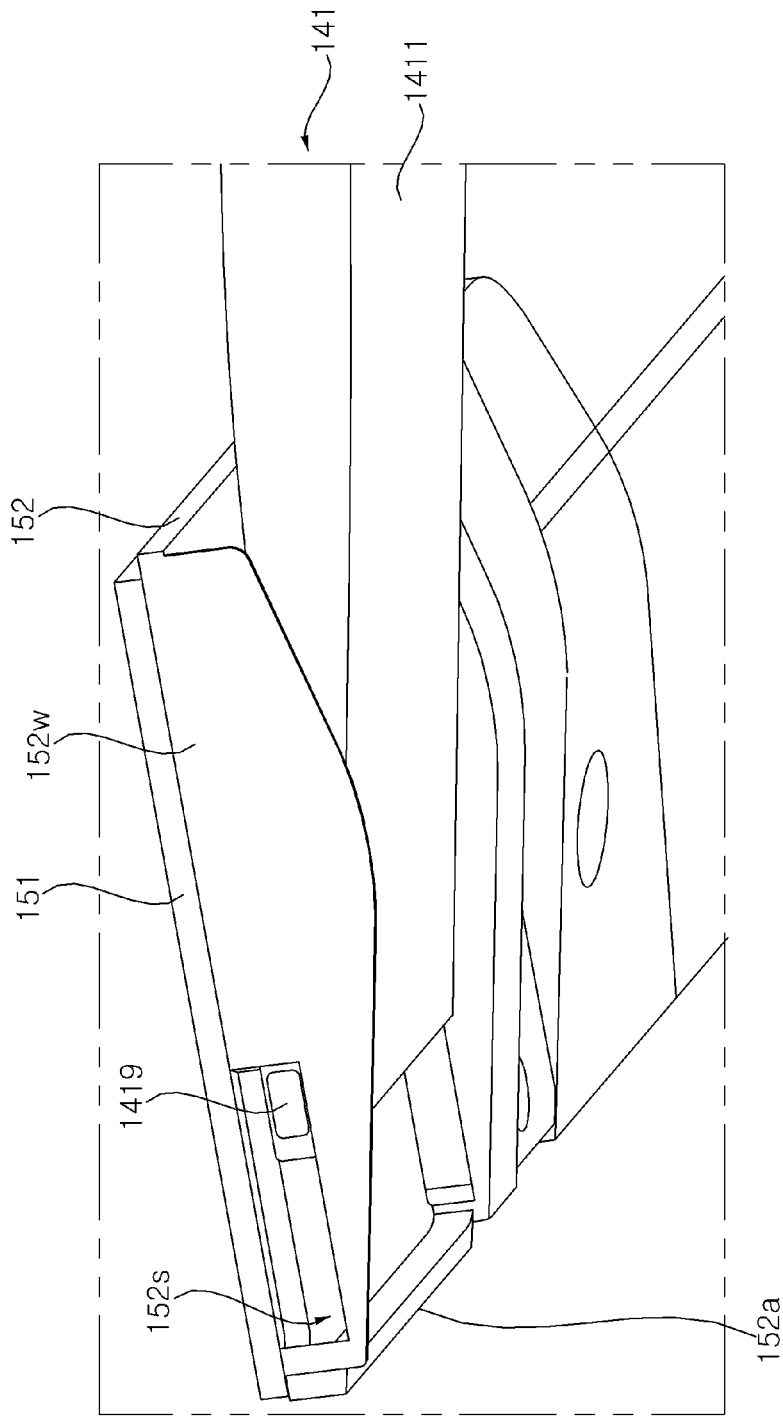

Referring to FIGS. 18 to 20, the side frame 151, 153 (see FIG. 12) may be coupled or fixed to the rear or the rear surface of the plate 120. As fastening members such as screws pass through the first side frame 153 to be fastened to the respective plurality of side fixing parts 162P (see FIG. 8) that are adjacent to the right side of the plate 120, the first side frame 153 may be coupled to the plate 120. As fastening members such as screws pass through the second side frame 151 to be fastened to the respective plurality of side fixing parts 162P (see FIG. 8) that are adjacent to the left side of the plate 120, the second side frame 151 may be coupled to the plate 120.

The second side frame 151 may include the sliding mount 152. The sliding mount 152 may be mounted on or fixed onto the side frame 151.

The second wing 141 may be coupled to the sliding mount 152 to be movable on the sliding mount 152. As the second wing 141 moves on the sliding mount 152, a distal end of the wing plate 1411 may be brought into contact with the sliding mount 152.

The sliding mount 152 may include a side wall 152W. The side wall 152W may face a side surface of the wing plate 1411. The wing plate 1411 may be brought into contact with the side wall 152W as the wing plate 1411 moves on the sliding mount 152. The side wall 152W may guide the movement of the wing plate 1411.

A guide slot 152S may be formed in the side wall 152W. The guide slot 152S may be formed through the side wall 152W in an elongated manner in a longitudinal direction of the wing plate 1411. For example, the guide slot 152S may be rectangular.

An end pin 1419 may be inserted into the guide slot 152S. The end pin 1419 may move on the guide slot 152S. The end pin 1419, together with the guide slot 152S, may limit or restrict the movement of the wing plate 1411. For example, the end pin 1419 may have a rectangular cross-section.

Accordingly, a force transmitted to the side frame 151 by the wing plate 1411 may be constantly maintained. In addition, as the display panel 110 and the plate 120 are curved, the flattening of regions adjacent to both ends of the display panel 110 and the plate 120 may be reduced or avoided.

In response to a pivot motion of the second wing 141, the second side frame 151 may push the plate 120 forward or pull the plate 120 rearward in a position adjacent to the left side of the plate 120. In response to a pivot motion of the first wing 143, the first side frame 153 may push the plate 120 forward or pull the plate 120 rearward in a position adjacent to the right side of the plate 120. That is, the plate 120 and the display panel 110 may be bent when pushed by the side frame 151, 153, or may be stretched when pulled by the side frame 151, 153.

Meanwhile, the sliding mount 152 may include a stopper 152*a* formed by bending a distal end thereof. When the plate 120 is maintained flat, the distal end of the wing plate 1411 may be in contact with the stopper 152*a* of the sliding mount 152. Accordingly, the front surface of the display panel 110 may be prevented from being curved convexly or outwardly due to both ends of the plate 120 being directed toward the rear of the display device 100.

Figure 21:
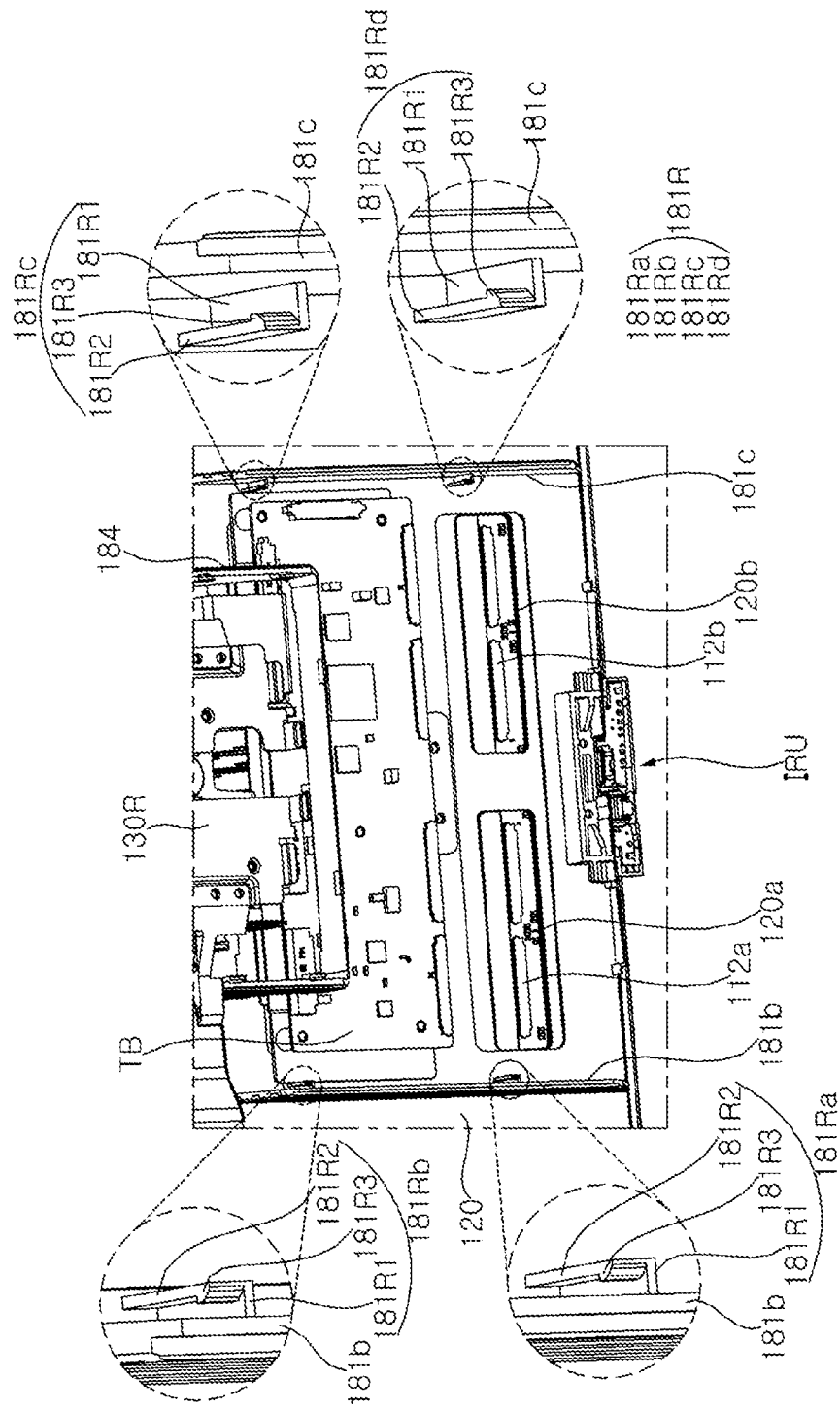

Referring to FIG. 21, a rib 181R may be provided inside each of the first bending portion 181*b* and the second bending portion 181*c*. A first rib 181Ra, 181Rb may be provided inside the first bending portion 181*b*, and a second rib 181Rc, 181Rd may be provided inside the second bending portion 181*c*. For example, the first rib 181Ra, 181Rb and the second rib 181Rc, 181Rd may be left-right symmetric.

The first rib 181Ra, 181Rb may include a protruding portion 181R1, an extension portion 181R2, and a contact portion 181R3. The protruding portion 181R1 may protrude from the inside of the first bending portion 181*b* toward the second bending portion 181*c*, and may extend in the front-and-rear direction, which is a widthwise direction of the first bending portion 181*b*. The extension portion 181R2 may extend from a distal end of the protruding portion 181R1 in a direction intersecting the protruding portion 181R1. The contact portion 181R3 may protrude from a rear end of the extension portion 181R2 toward the inside of the first bending portion 181*b*, and may have a hook shape. For example, a plurality of first ribs 181Ra and 181Rb may be spaced apart from each other in the up-and-down direction, which is a lengthwise or longitudinal direction of the first bending portion 181*b*.

The second rib 181Rc, 181Rd may include a protruding portion 181R1, an extension portion 181R2, and a contact portion 181R3. The protruding portion 181R1 may protrude from the inside of the second bending portion 181c toward the first bending portion 181b, and may extend in the front-and-rear direction, which is a widthwise direction of the second bending portion 181c. The extension portion 181R2 may extend from a distal end of the protruding portion 181R1 in a direction intersecting the protruding portion 181R1. The contact portion 181R3 may protrude from a rear end of the extension portion 181R2 toward the inside of the second bending portion 181c, and may have a hook shape. For example, a plurality of second ribs 181Rc and 181Rd may be spaced apart from each other in the up-and-down direction, which is a lengthwise or longitudinal direction of the second bending portion 181c.

Figure 22:
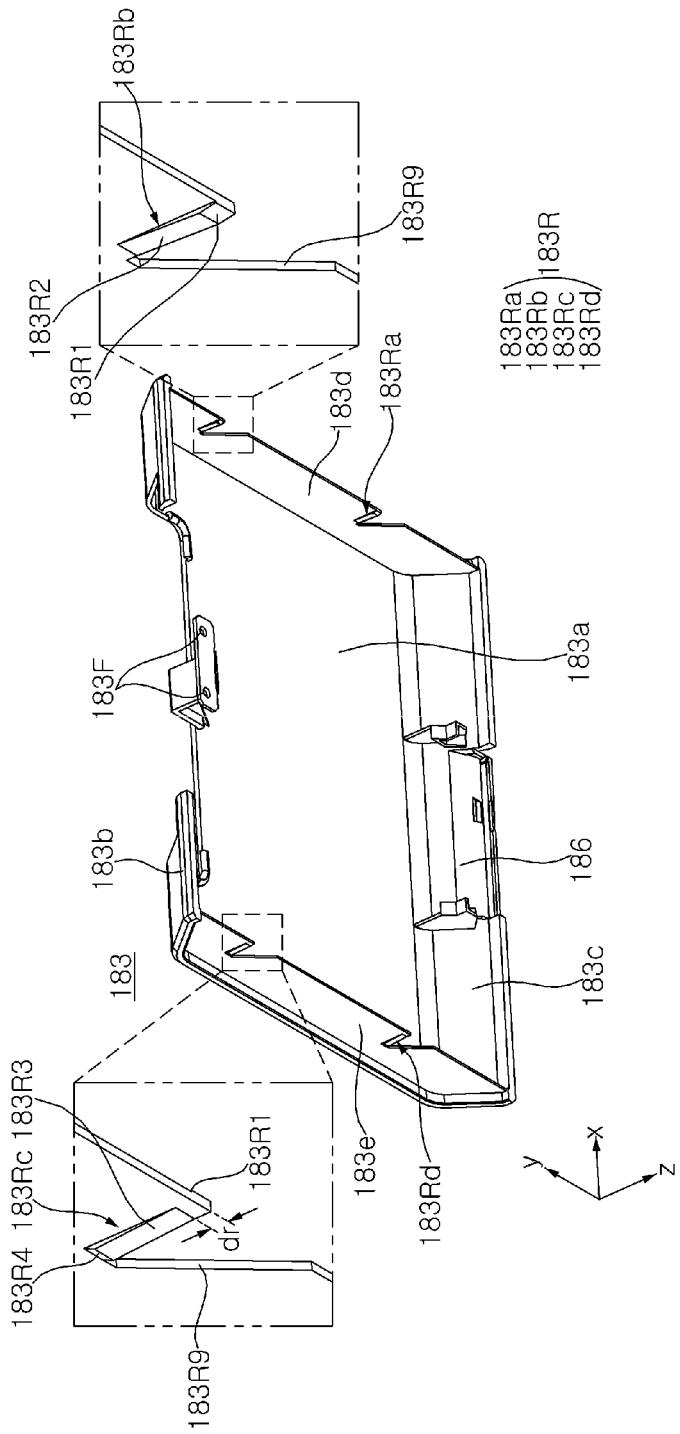

Referring to FIG. 22, the rear cover 183 may have a box shape with an open front side. The rear cover 183 may include a rear part 183a, a top part 183b, a bottom part 183c, a first side part 183d, and a second side part 183e.

The rear part 183a may define a rear surface of the rear cover 183. The rear part 183a may cover the rear of the timing controller board TB (see FIG. 21).

The top part 183b may be bent forward at an upper side of the rear part 183a, and an angle between the top part 183b and the rear part 183a may be an obtuse angle. A portion of the top part 183b may be cut out, and a lower side of the upper cover 184 may be disposed thereon (see FIG. 9).

The bottom part 183c may be bent forward at a lower side of the rear part 183a, and an angle between the bottom part 183c and the rear part 183a may be an obtuse angle.

The first side part 183d may be bent forward at a left side of the rear part 183a, and may intersect or orthogonal to the rear part 183a. The first side part 183d may be referred to as a left part 183d.

The second side part 183e may be bent forward at a right side of the rear part 183a, and may intersect or orthogonal to the rear part 183a. The second side part 183e may be referred to as a right part 183e.

A support rib 183R may be provided on each of the first side part 183d and the second side part 183e. A first support rib 183Ra, 183Rb may be provided on the first side part 183d, and a second support rib 183Rc, 183Rd may be provided on the second side part 183e. For example, the first support rib 183Ra, 183Rb and the second support rib 183Rc, 183Rd may have the same shape.

The first support rib 183Ra, 183Rb may be provided inside and outside the first side part 183d. For example, a plurality of first support ribs 183Ra and 183Rb may be spaced apart from each other in the up-and-down direction, which is a lengthwise or longitudinal direction of the first side part 183d. Meanwhile, a triangular notch 183R9 may be provided at a front end of the first side part 183d, and may adjoin the first support rib 183Ra, 183Rb. The triangular notch 183R9 may improve the convenience of assembly of the rear cover 183 and the bracket 180.

A first support portion 183R1 and a second support portion 183R2 of the first support rib 183Ra, 183Rb may protrude from the inside of the first side part 183d toward the second side part 183e. A protruding height of the first support portion 183R1 may gradually increase from the front end of the first side part 183d toward the rear. The second support portion 183R2 may be connected to the first support portion 183R1, and a protruding height of the second support portion 183R2 may gradually decrease from the first support portion 183R1 toward the rear. A length of the second support portion 183R2 may be greater than a length of the first support portion 183R1, and a boundary between the second support portion 183R2 and the first support portion 183R1 may define maximum protruding heights of the second support portion 183R2 and the first support portion 183R1.

A third support portion 183R3 and a fourth support portion 183R4 of the first support rib 183Ra, 183Rb may protrude from the outside of the first side part 183d in a direction opposite of the first support portion 183R1 and the second support portion 183R2. The third support portion 183R3 may be spaced rearward from the front end of the first side part 183d by a predetermined distance dr. A protruding height of the third support portion 183R3 may gradually increase toward the rear. A length of the third support portion 183R3 may correspond to (e.g., equal to) a length of the second support portion 183R2. The fourth support portion 183R4 may be connected to the third support portion 183R3, and a protruding height of the fourth support portion 183R4 may gradually decrease from the third support portion 183R toward the rear. A length of the fourth support portion 183R4 may correspond to (e.g., equal to) a length of the first support portion 183R1. A boundary between the fourth support portion 183R4 and the third support portion 183R3 may define maximum protruding heights of the fourth support portion 183R4 and the third support portion 183R3. For example, the maximum protruding heights of the fourth support portion 183R4 and the third support portion 183R3 may be equal to or similar to the maximum protruding heights of the second support portion 183R2 and the first support portion 183R1.

The second support rib 183Rc, 183Rd may be provided inside and outside the second side part 183e. For example, a plurality of second support ribs 183Rc and 183Rd may be spaced apart from each other in the up-and-down direction, which is a lengthwise or longitudinal direction of the second side part 183e. Meanwhile, a triangular notch 183R9 may be provided at a front end of the second side part 183e, and may adjoin the second support rib 183Rc, 183Rd. The triangular notch 183R9 may improve the convenience of assembly of the rear cover 183 and the bracket 180.

A first support portion 183R1 and a second support portion 183R2 of the second support rib 183Rc, 183Rd may protrude from the inside of the second side part 183e toward the first side part 183d. A protruding height of the first support portion 183R1 may gradually increase from the front end of the second side part 183e toward the rear. The second support portion 183R2 may be connected to the first support portion 183R1, and a protruding height of the second support portion 183R2 may gradually decrease from the first support portion 183R1 toward the rear. A length of the second support portion 183R2 may be greater than a length of the first support portion 183R1, and a boundary between the second support portion 183R2 and the first support portion 183R1 may define maximum protruding heights of the second support portion 183R2 and the first support portion 183R1.

A third support portion 183R3 and a fourth support portion 183R4 of the second support rib 183Rc, 183Rd may protrude from the outside of the second side part 183e in a direction opposite of the first support portion 183R1 and the second support portion 183R2. The third support portion 183R3 may be spaced rearward from the front end of the second side part 183e by a predetermined distance dr. A protruding height of the third support portion 183R3 may gradually increase toward the rear. A length of the third support portion 183R3 may correspond to (e.g., equal to) a length of the second support portion 183R2. The fourth support portion 183R4 may be connected to the third support portion 183R3, and a protruding height of the fourth support portion 183R4 may gradually decrease from the third support portion 183R toward the rear. A length of the fourth support portion 183R4 may correspond to (e.g., equal to) a length of the first support portion 183R1. A boundary between the fourth support portion 183R4 and the third support portion 183R3 may define maximum protruding heights of the fourth support portion 183R4 and the third support portion 183R3. For example, the maximum protruding heights of the fourth support portion 183R4 and the third support portion 183R3 may be equal to or similar to the maximum protruding heights of the second support portion 183R2 and the first support portion 183R1.

Meanwhile, a coupling part 183F of the rear cover 183 may be disposed at a central portion of the upper side of the rear part 183a. Fastening members such as screws may pass through the coupling part 183F and the respective pair of third fixing holes 180Fc of the first bracket 181 to be fastened to the respective pair of third center fixing parts 162Fc (see FIGS. 6 and 7). Accordingly, the rear cover 183 may be coupled to the plate 120.

Here, a position in which the rear cover 183 and the plate 120 are coupled by the coupling part 183F may be closer to a center of the plate 120 than a position in which the first bracket 181 and the plate 120 are coupled by the locking protrusion 180H (see FIGS. 6 and 7).

Referring back to FIGS. 21 and 22, the plurality of first ribs 181Ra and 181Rb may correspond to the plurality of first support ribs 183Ra and 183Rb, respectively. A first lower rib 181Ra may be aligned with a first lower support rib 183Ra to face the first lower support rib 183Ra, and a first upper rib 181Rb may be aligned with a first upper support rib 183Rb to face the first upper support rib 183Rb.

The plurality of second ribs 181Rc and 181Rd may correspond to the plurality of second support ribs 183Rc and 183Rd, respectively. A second upper rib 181Rc may be aligned with a second upper support rib 183Rc to face the second upper support rib 183Rc, and a second lower rib 181Rd may be aligned with a second lower support rib 183Rd to face the second lower support rib 183Rd.

Figure 23:
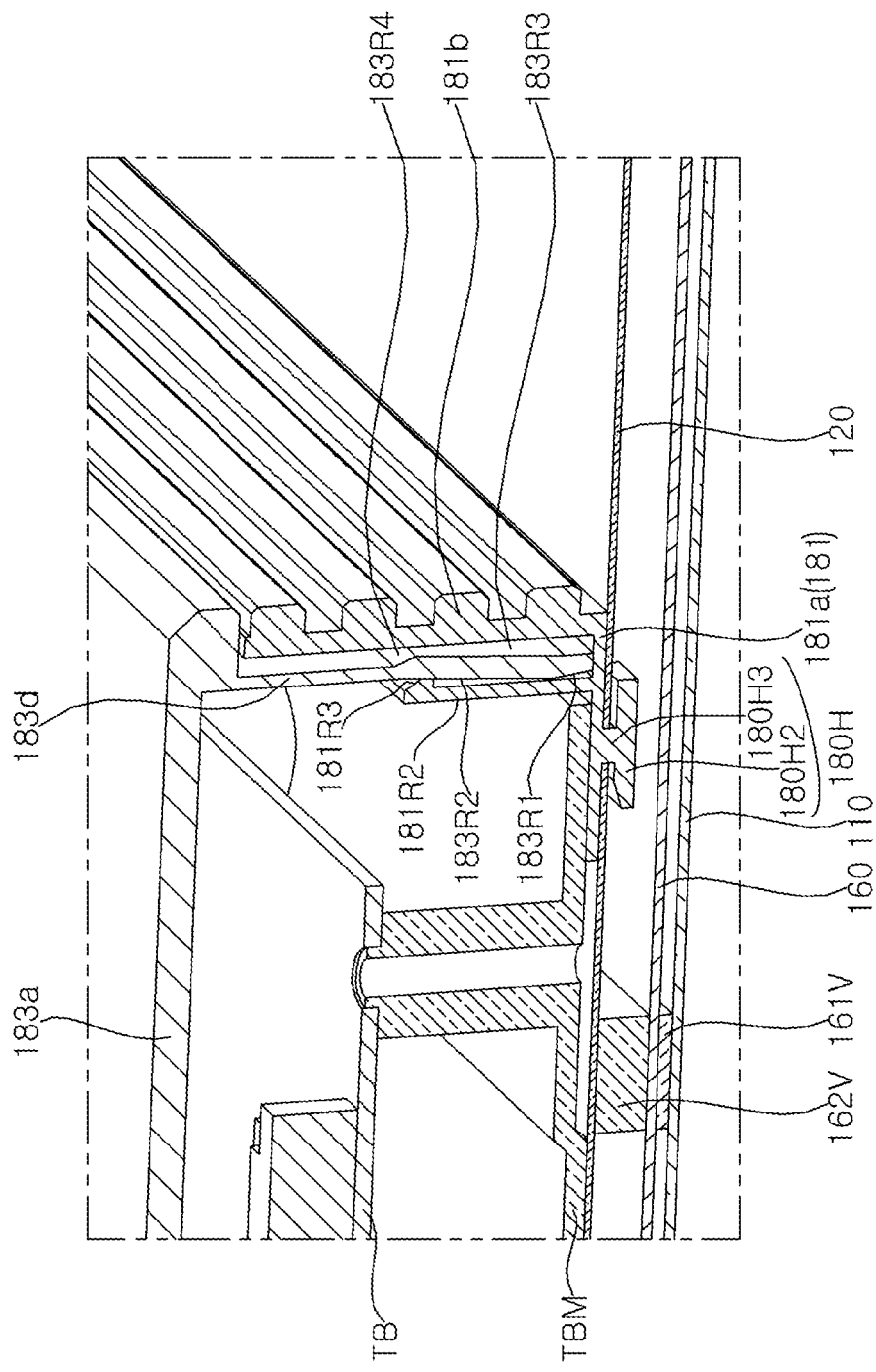
Figure 24:
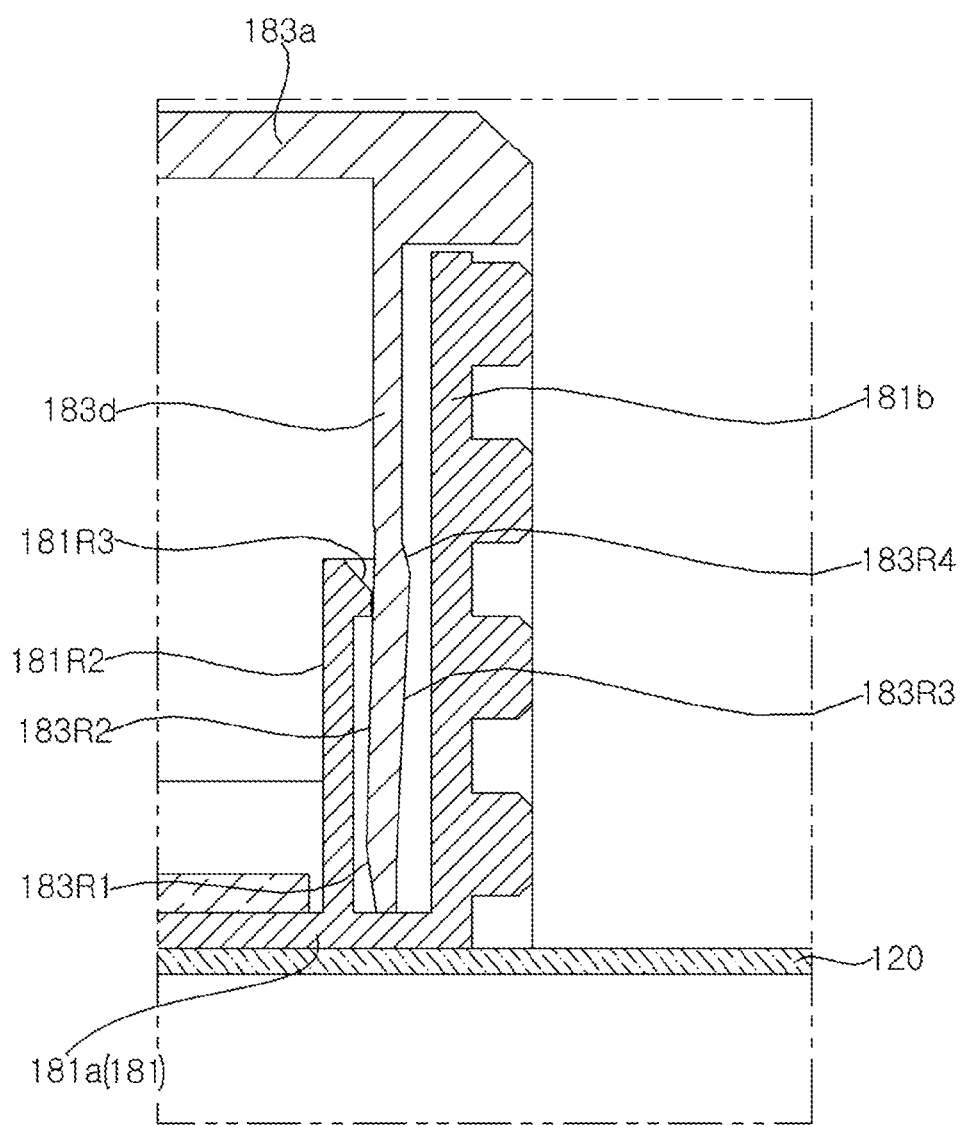

Referring to FIGS. 23 and 24, the first side part 183d may be inserted between the first rib 181Ra, 181Rb (see FIG. 21) and the first bending portion 181b. Similarly, the second side part 183e (see FIG. 22) may be inserted between the second rib 181Rc, 181Rd (see FIG. 21) and the second bending portion 181c (see FIG. 21). Hereinafter, for the sake of brevity, a description will be made based on the first side part 183d and the first rib 181Ra, 181Rb, however the description thereof may be equally applied to the second side part 183e and the second rib 181Rc, 181Rd.

When the plate 120 is in a flat state (or a state of being flat), the front end of the first side part 183d may be in contact with or adjacent to a rear surface of the first bracket base 181a. The contact portion 181R3 of the first rib 181Ra, 181Rb may be in contact with or adjacent to the second support portion 183R2 of the first side part 183d. The third support portion 183R3 and the fourth support portion 183R4 of the first rib 181Ra, 181Rb may be spaced apart from the inside of the first bending portion 181b.

Figure 25:
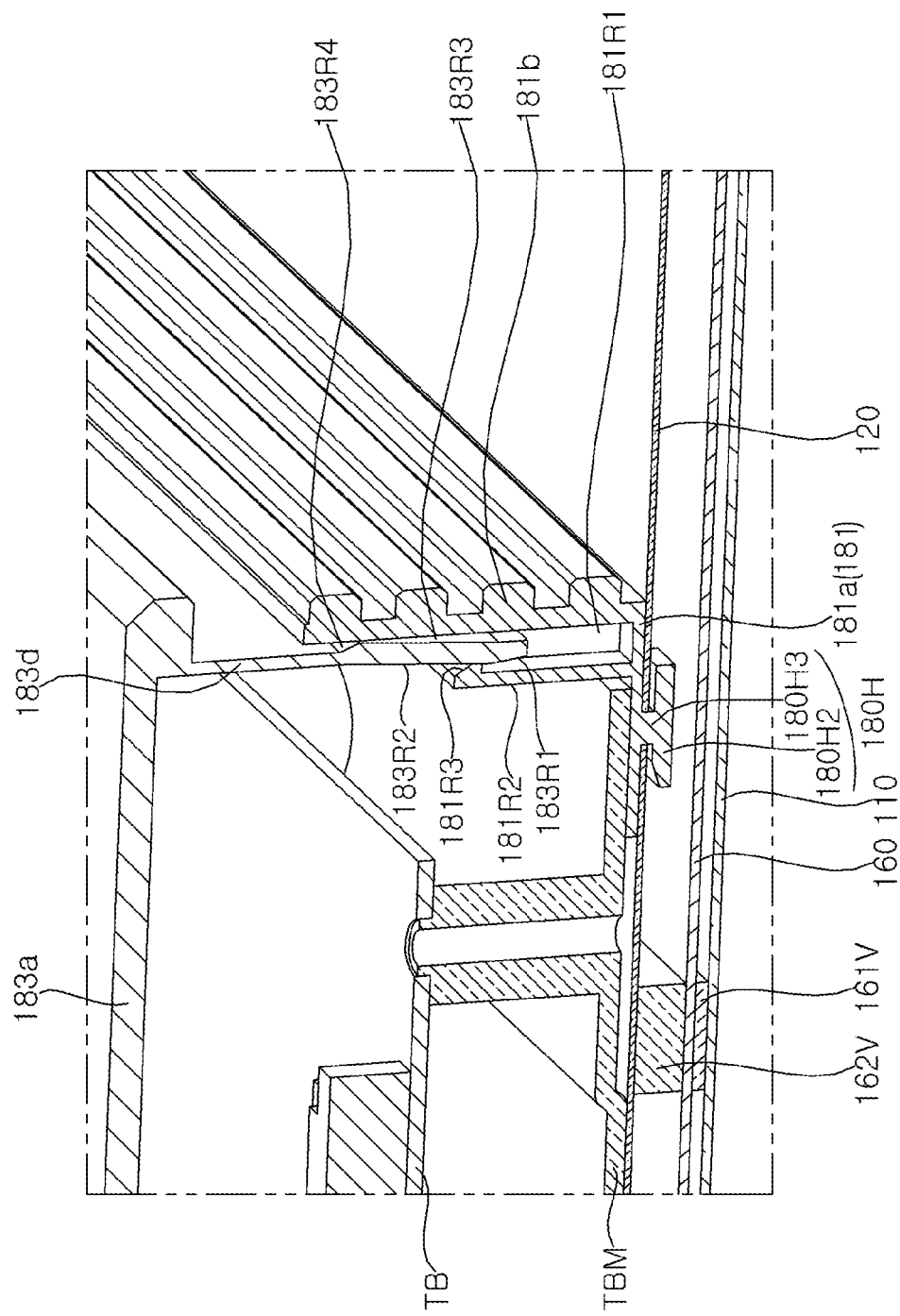
Figure 26:
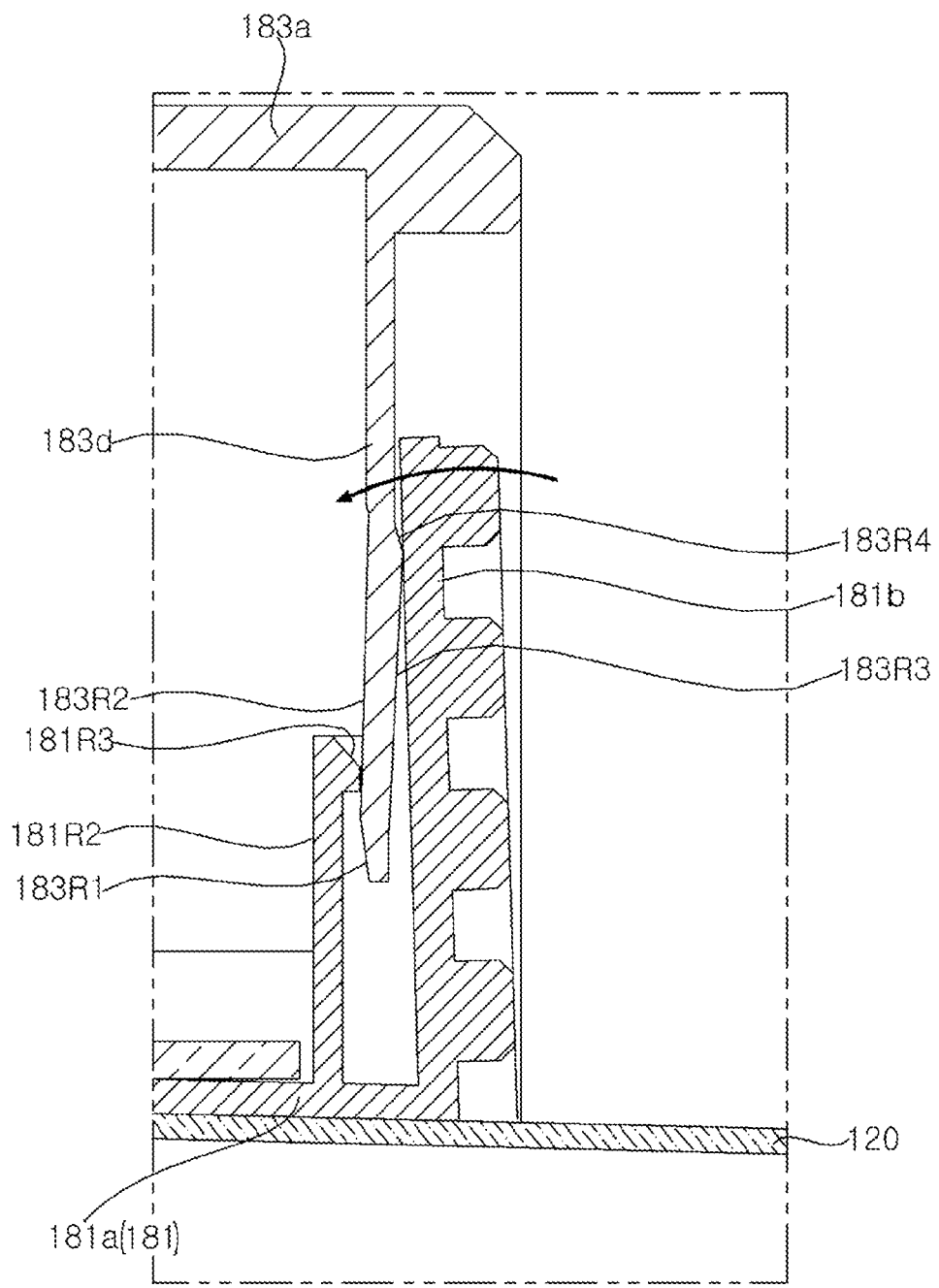

Referring to FIGS. 25 and 26, when the plate 120 is in a bent or curved state (or a state of being bent or curved), the first bracket base 181a may move in a direction away from the front end of the first side part 183d. The contact portion 181R3 of the first rib 181Ra, 181Rb (see FIG. 21) may slide on the second support portion 183R2 of the first side part 183d toward the first support portion 183R1. The third support portion 183R3 and the fourth support portion 183R4 of the first rib 181Ra, 181Rb may approach (or get closer) and come into contact with the inside of the first bending portion 181b.

Accordingly, even when the plate 120 is bent, the first side part 183d may allow the first rib 181Ra, 181Rb and the first bending portion 181b of the first bracket 181, which are fixed to the plate 120 through the locking protrusion 180H, to maintain a state parallel to the front-and-rear direction as when the plate 120 is in the flat state. Here, the locking protrusion 180H may be located opposite the first rib 181Ra, 181Rb in the vicinity of the first rib 181Ra, 181Rb. In other words, the first rib 181Ra, 181Rb and the first bending portion 181b may be tilted inward of the first bracket 181 from a normal direction of the first bracket base 181a by the first side part 183d (refer to the arrow of FIG. 26). That is, it is possible to minimize the separation between the first bending portion 181b and the first side part 183d due to the first bending portion 181b from being away from the first side part 183d in response to the bending of the plate 120, and to maintain a covering function of the first bending portion 181b. This may prevent foreign matter from being introduced between the first bending portion 181b and the first side part 183d or pinching of a finger of a user.

Figure 27:
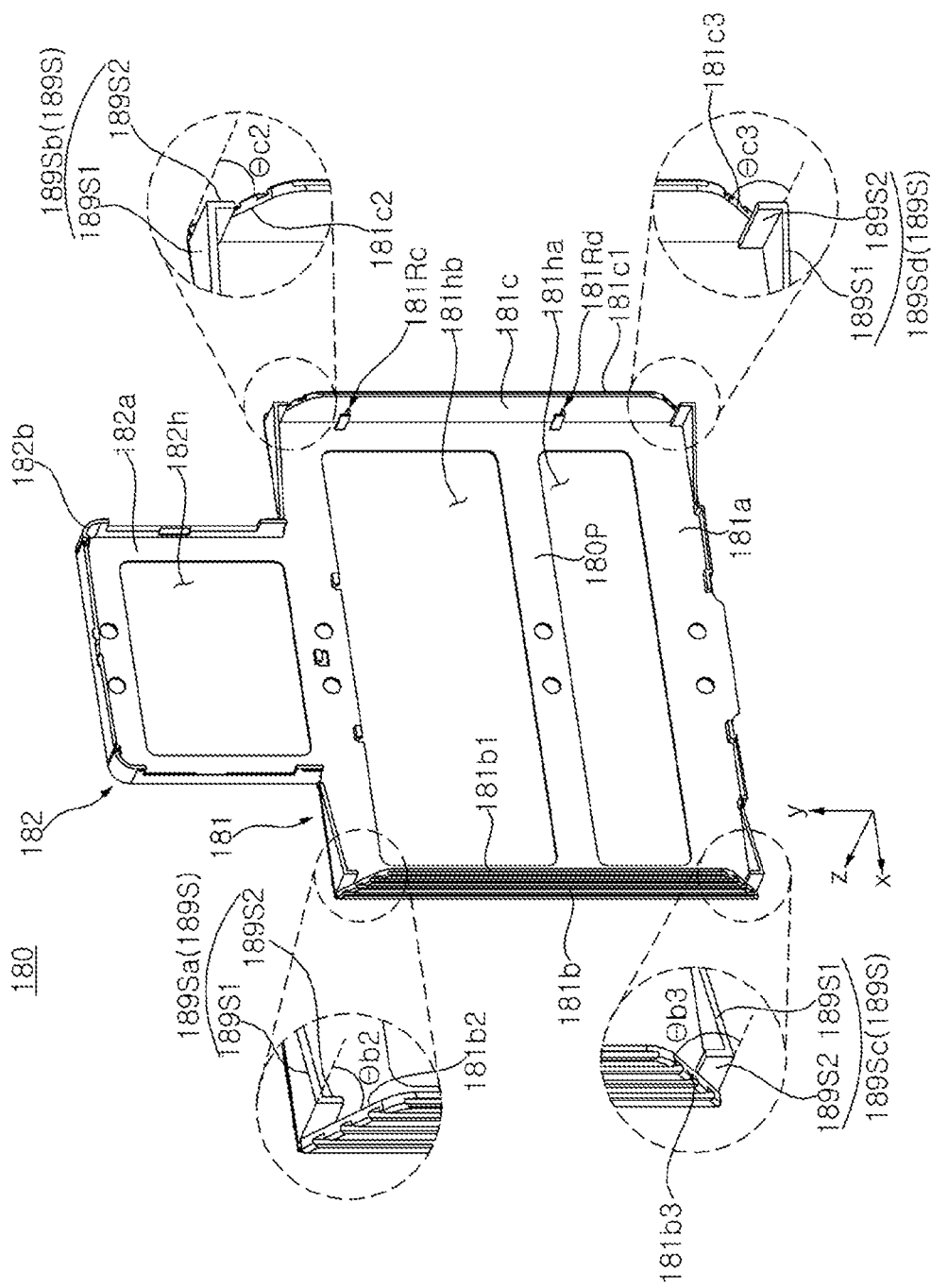

Referring to FIG. 27, the first bending portion 181b may have a trapezoidal shape. An upper side 181b2 of the first bending portion 181b may form an acute angle Θ b2 (theta b2) with respect to a line parallel to the front-and-rear direction, the acute angle Θ b2 being formed below the line. A lower side 181b3 of the first bending portion 181b may form an acute angle Θ b3 (theta b3) with respect to a line parallel to the front-and-rear direction, the acute angle Θ b3 being formed above the line.

A first shield 189Sa, 189Sc may include a first upper shield 189Sa and a first lower shield 189Sc. For example, the first upper shield 189Sa and the first lower shield 189Sc may be up-down symmetric.

The first upper shield 189Sa may adjoin the first bending portion 181b, and may overlap the top part 183b (see FIG. 28) in front and rear. The first upper shield 189Sa may include a horizontal shield 189S1 with a right-angled triangular shape and a vertical shield 189S2 with a rectangular shape that intersects the horizontal shield 189S1. The horizontal shield 189S1 may adjoin an upper side of the first bracket base 181a, and may be coupled or attached to the rear surface of the first bracket base 181a. The vertical shield 189S2 may be disposed between the horizontal shield 189S1 and the upper side 181b2 of the first bending portion 181b. The first upper shield 189Sa may have an elastic force. For example, the first upper shield 189Sa may include a resin material such as polycarbonate (PC). Accordingly, at a boundary between the horizontal shield 189S1 and the vertical shield 189S2, the first upper shield 189Sa may be elastically deformed while being pressed toward the first bracket base 181a or may be restored to its original state, namely, a folded state by the elastic force.

The first lower shield 189Sc may adjoin the first bending portion 181b, and may overlap the bottom part 183c (see FIG. 28) in front and rear. The first lower shield 189Sc may include a horizontal shield 189S1 with a right-angled triangular shape and a vertical shield 189S2 with a rectangular shape that intersects the horizontal shield 189S1. The horizontal shield 189S1 may be adjacent to a lower side of the first bracket base 181a, and may be coupled or attached to the rear surface of the first bracket base 181a. The vertical shield 189S2 may be disposed between the horizontal shield 189S1 and the lower side 181b3 of the first bending portion 181b. The first lower shield 189Sc may have an elastic force.

For example, the first lower shield 189Sc may include a resin material such as polycarbonate (PC). Accordingly, at the boundary between the horizontal shield 189S1 and the vertical shield 189S2, the first lower shield 189Sc may be elastically deformed while being pressed toward the first bracket base 181a or may be restored to its original state, namely, a folded state by the elastic force.

The second bending portion 181c may have a trapezoidal shape. An upper side 181c2 of the second bending portion 181c may form an acute angle Θc2 (theta c2) with respect to a line parallel to the front-and-rear direction, the acute angle ι c2 being formed below the line. A lower side 181c3 of the second bending portion 181c may form an acute angle Θ c3 (theta c3) with respect to a line parallel to the front-and-rear direction, the acute angle Θ c3 being formed above the line.

A second shield 189Sb, 189Sd may include a second upper shield 189Sb and a second lower shield 189Sd. For example, the second upper shield 189Sb and the second lower shield 189Sd may be up-down symmetric.

The second upper shield 189Sb may adjoin the second bending portion 181c, and may overlap the top part 183b (see FIG. 28) in front and rear. The second upper shield 189Sb may include a horizontal shield 189S1 with a right-angled triangular shape and a vertical shield 189S2 with a rectangular shape that intersects the horizontal shield 189S1. The horizontal shield 189S1 may be adjacent to the upper side of the first bracket base 181a, and may be coupled or attached to the rear surface of the first bracket base 181a. The vertical shield 189S2 may be disposed between the horizontal shield 189S1 and the upper side 181c2 of the second bending portion 181c. The second upper shield 189Sb may have an elastic force. For example, the second upper shield 189Sb may include a resin material such as polycarbonate (PC). Accordingly, at the boundary between the horizontal shield 189S1 and the vertical shield 189S2, the second upper shield 189Sb may be elastically deformed while being pressed toward the first bracket base 181a or may be restored to its original state, namely, a folded state by the elastic force.

The second lower shield 189Sd may adjoin the second bending portion 181c, and may overlap the bottom part 183c (see FIG. 28) in front and rear. The second lower shield 189Sd may include a horizontal shield 189S1 with a right-angled triangular shape and a vertical shield 189S2 with a rectangular shape that intersects the horizontal shield 189S1. The horizontal shield 189S1 may be adjacent to the lower side of the first bracket base 181a, and may be coupled or attached to the rear surface of the first bracket base 181a. The vertical shield 189S2 may be disposed between the horizontal shield 189S1 and the lower side 181c3 of the second bending portion 181c. The second lower shield 189Sd may have an elastic force. For example, the second lower shield 189Sd may include a resin material such as polycarbonate (PC). Accordingly, at the boundary between the horizontal shield 189S1 and the vertical shield 189S2, the second lower shield 189Sd may be elastically deformed while being pressed toward the first bracket base 181a or may be restored to its original state, namely, a folded state by the elastic force.

Figure 28:
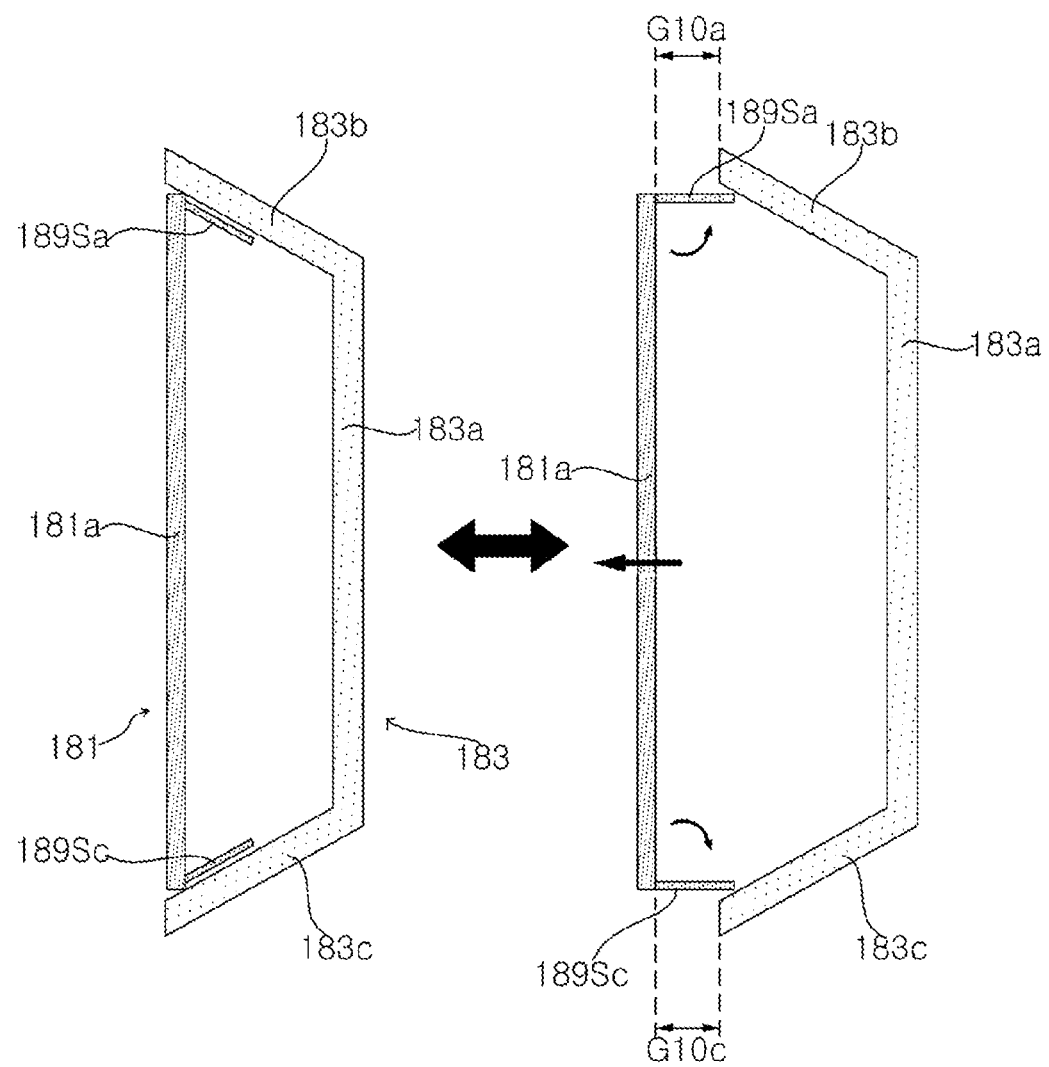

Referring to FIGS. 27 and 28, when the first bracket 181 is bent, the first bracket base 181a may slide forward relative to the rear cover 183. Here, the first shield 189Sa, 189Sc and the second shield 189Sb, 189Sd may be unfolded as shown in FIG. 27, and may cover a gap G10a between the top part 183b and the first bracket 181, and a gap G10c between the bottom part 183c and the first bracket 181 (refer to the drawings of FIG. 28 from the left to the right).

When the first bracket 181 is stretched to be flat again, the first bracket base 181a may slide rearward relative to the rear cover 183. At this time, the first shield 189Sa, 189Sc and the second shield 189Sb, 189Sd may be pressed by the top part 183b and the bottom part 183c (refer to the drawings of FIG. 28 from the right to the left).

Accordingly, in response to the bending or stretching of the display device 100, an inside of the bracket 180 may be continuously covered by the rear cover 183 and the shield 189S. This may prevent foreign matter from being introduced into the bracket 180 or pinching of a finger of a user.

Referring to FIGS. 1 to 28, a display device according to one aspect of the present disclosure may include: a flexible display panel having a left side and a right side opposite to each other in a curved direction of the display panel; a flexible plate disposed at a rear of the display panel and coupled to the display panel; a flexible bracket disposed at a rear of the plate, the bracket being fixed to the plate at a position adjacent to a periphery of the bracket; and a rear cover covering a rear of the bracket, the rear cover being fixed to the bracket at a position adjacent to a central portion of the bracket, wherein the rear cover may include a first side part protruding from a left side of the rear cover toward the bracket, and wherein the bracket may include: a first bending portion protruding rearward from a left side of the bracket; and a first rib provided inside the first bending portion, the first rib being disposed opposite the first bending portion with respect to the first side part.

The rear cover may include a second side part protruding from a right side of the rear cover toward the bracket. The bracket may include: a second bending portion protruding rearward from a right side of the bracket; and a second rib provided inside the second bending portion, the second rib being disposed opposite the second bending portion with respect to the second side part.

The second side part may have a same shape as the first side part. The second rib and the first rib may be left-right symmetric.

The first rib may be brought into sliding contact with the first side part as a curvature of the display panel is changed.

The bracket may include a bracket base facing a rear surface of the plate. The first bending portion may be tilted toward the first side part from a normal direction of the bracket base as the display panel is bent.

The first side part may further include: a first support portion formed inside the first side part, the first support portion having a protruding height that gradually increases rearward from a front end of the first side part; and a second support portion formed inside the first side part and connected to the first support portion, the second support portion having a protruding height that gradually decreases rearward from the first support portion. A length of the second support portion may be greater than a length of the first support portion. The first rib may be brought into sliding contact with the first support portion or the second support portion as the curvature of the display panel is changed.

The first rib may further include: a protruding portion protruding from an inside of the first bending portion; an extension portion extending from a distal end of the protruding portion in a direction intersecting the protruding portion, the extension portion being disposed opposite the first bending portion with respect to the first side part; and a contact portion protruding from a rear end of the extension portion toward the first side part. The contact portion may be in contact with the first support portion or the second support portion.

The first side part may further include: a third support portion formed outside the first side part and spaced rearward from the front end of the first side part, the third support portion having a protruding height that gradually increases rearward; and a fourth support portion formed outside the first side part and connected to the third support portion, the fourth support portion having a protruding height that gradually decreases rearward from the third support portion. A length of the third support portion may correspond to a length of the second support portion, and a length of the fourth support portion may correspond to a length of the first support portion. The first bending portion may get closer to the third support portion and the fourth support portion as the display panel is bent.

The first support portion and the second support portion may overlap the third support portion and the fourth support portion in a thickness direction of the first side part. The first side part may further include a triangular notch formed at the front end of the first side part and adjacent to the first support portion and the second support portion.

The bracket may include a first locking protrusion adjacent to the left side of the bracket, protruding from a front surface of the bracket toward the plate, and coupled to the plate.

The display device may further include a flexible inner plate disposed between the display panel and the plate and coupled to the display panel and the plate. The inner plate may include a center fixing part protruding rearward from a rear surface of the inner plate and passing through the plate. The rear cover may include a coupling part disposed opposite the center fixing part with respect to the bracket and coupled to the center fixing part.

The rear cover may further include a top part protruding from an upper side of the rear cover toward the bracket. The bracket may further include a first shield disposed next to the first bending portion and overlapping the top part in front and rear. The first shield may have elasticity, and may cover a gap between the top part and the bracket.

The first shield may include: a horizontal shield intersecting the bracket; and a vertical shield intersecting the horizontal shield. At a boundary between the horizontal shield and the vertical shield, the first shield may be elastically deformed while being pressed by the top part or may be restored to an original state by an elastic force.

The display device may further include an electronic component disposed between the bracket and the rear cover, and coupled to the bracket.

The display device may further include: a drive module disposed opposite the plate with respect to the bracket and coupled to the bracket, the drive module including a slider configured to perform a linear reciprocating motion and a motor configured to provide power to the slider; a first wing disposed at the rear of the plate and having one end coupled to the slider and another end adjacent to the left side of the display panel to be coupled to the plate, the first wing including a first pivot shaft adjacent to the one end of the first wing; and a second wing disposed at the rear of the plate and having one end coupled to the slider and another end adjacent to the right side of the display panel to be coupled to the plate, the second wing including a second pivot shaft adjacent to the one end of the second wing.

The effects of the display device according to the present disclosure will be described as follows.

According to at least one of the embodiments of the present disclosure, a structure capable of freely changing a curvature of a display panel may be provided.

According to at least one embodiment of the present disclosure, a mechanism capable of freely changing a curvature of a display panel may be provided.

According to at least one of the embodiments of the present disclosure, a structure capable of minimizing the separation of a side surface of a bracket to which an electronic component such as a timing controller board is mounted, which is due to a display panel being bent, may be provided.

According to at least one of the embodiments of the present disclosure, a sliding structure of a side surface of a bracket for a rear cover that covers the rear of the bracket may be provided.

According to at least one of the embodiments of the present disclosure, a structure capable of preventing a display panel from being exposed to the outside in the vicinity of a corner of a rear cover, which is due to the display panel being bent, may be provided.

Certain embodiments or other embodiments of the present disclosure described above are not mutually exclusive or distinct from each other. Any or all elements of the embodiments of the present disclosure described above may be combined or combined with each other in configuration or function.

For example, a configuration "A" described in one embodiment and/or drawings may be combined with a configuration "B" described in another embodiment and/or drawings. Namely, although the combination between the configurations is not directly described, the combination is possible except in the case where it is described that the combination is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

What is claimed is:

1. A display device comprising:
a flexible display panel having a left side and a right side opposite to each other in a curved direction of the display panel;
a flexible plate disposed at a rear of the display panel and to which the display panel is coupled;
a flexible bracket disposed at a rear of the plate, the bracket being fixed to the plate at a position adjacent to a periphery of the bracket; and
a rear cover covering a rear of the bracket, the rear cover being fixed to the bracket at a position adjacent to a central portion of the bracket,
wherein the rear cover comprises a first side part protruding from a left side of the rear cover toward the bracket, and
wherein the bracket comprises:
a first bending portion protruding rearward from a left side of the bracket; and
a first rib provided inside the first bending portion, the first rib being disposed opposite the first bending portion with respect to the first side part.

2. The display device of claim 1, wherein the rear cover comprises a second side part protruding from a right side of the rear cover toward the bracket, and
wherein the bracket comprises:
a second bending portion protruding rearward from a right side of the bracket; and a second rib provided inside the second bending portion, the second rib being disposed opposite the second bending portion with respect to the second side part.

3. The display device of claim 2, wherein the second side part has a same shape as the first side part, and
wherein the second rib and the first rib are left-right symmetric.

4. The display device of claim 1, wherein the first rib is brought into sliding contact with the first side part as a curvature of the display panel is changed.

5. The display device of claim 4, wherein the bracket comprises a bracket base facing a rear surface of the plate, and
wherein the first bending portion is tilted toward the first side part from a normal direction of the bracket base as the display panel is bent.

6. The display device of claim 5, wherein the first side part further comprises:
a first support portion formed inside the first side part, the first support portion having a protruding height that gradually increases rearward from a front end of the first side part; and
a second support portion formed inside the first side part and connected to the first support portion, the second support portion having a protruding height that gradually decreases rearward from the first support portion,
wherein a length of the second support portion is greater than a length of the first support portion, and
wherein the first rib is brought into sliding contact with the first support portion or the second support portion as the curvature of the display panel is changed.

7. The display device of claim 6, wherein the first rib further comprises:
a protruding portion protruding from an inside of the first bending portion;
an extension portion extending from a distal end of the protruding portion in a direction intersecting the protruding portion, the extension portion being disposed opposite the first bending portion with respect to the first side part; and
a contact portion protruding from a rear end of the extension portion toward the first side part, and
wherein the contact portion is in contact with the first support portion or the second support portion.

8. The display device of claim 6, wherein the first side part further comprises:
a third support portion formed outside the first side part and spaced rearward from the front end of the first side part, the third support portion having a protruding height that gradually increases rearward; and
a fourth support portion formed outside the first side part and connected to the third support portion, the fourth support portion having a protruding height that gradually decreases rearward from the third support portion,
wherein a length of the third support portion corresponds to a length of the second support portion,
wherein a length of the fourth support portion corresponds to a length of the first support portion, and
wherein the first bending portion gets closer to the third support portion and the fourth support portion as the display panel is bent.

9. The display device of claim 8, wherein the first support portion and the second support portion overlap the third support portion and the fourth support portion in a thickness direction of the first side part, and
wherein the first side part further comprises a triangular notch formed at the front end of the first side part and adjacent to the first support portion and the second support portion.

10. The display device of claim 1, wherein the bracket comprises a first locking protrusion adjacent to the left side of the bracket, protruding from a front surface of the bracket toward the plate, and coupled to the plate.

11. The display device of claim 1, further comprising a flexible inner plate disposed between the display panel and the plate and coupled to the display panel and the plate,
wherein the inner plate comprises a center fixing part protruding rearward from a rear surface of the inner plate and passing through the plate, and
wherein the rear cover comprises a coupling part disposed opposite the center fixing part with respect to the bracket and coupled to the center fixing part.

12. The display device of claim 1, wherein the rear cover further comprises a top part protruding from an upper side of the rear cover toward the bracket,
wherein the bracket further comprises a first shield disposed next to the first bending portion and overlapping the top part in front and rear, and
wherein the first shield has elasticity and covers a gap between the top part and the bracket.

13. The display device of claim 12, wherein the first shield comprises:
a horizontal shield intersecting the bracket; and
a vertical shield intersecting the horizontal shield, and
wherein the first shield, at a boundary between the horizontal shield and the vertical shield, is elastically deformed while being pressed by the top part or is restored to an original state by an elastic force.

14. The display device of claim 1, further comprising an electronic component disposed between the bracket and the rear cover, and coupled to the bracket.

15. The display device of claim 1, further comprising:
a drive module disposed opposite the plate with respect to the bracket and coupled to the bracket, the drive module comprising a slider configured to perform a linear reciprocating motion and a motor configured to provide power to the slider;
a first wing disposed at the rear of the plate and having one end coupled to the slider and another end adjacent to the left side of the display panel to be coupled to the plate, the first wing comprising a first pivot shaft adjacent to the one end of the first wing; and
a second wing disposed at the rear of the plate and having one end coupled to the slider and another end adjacent to the right side of the display panel to be coupled to the plate, the second wing comprising a second pivot shaft adjacent to the one end of the second wing.

* * * * *